United States Patent [19]

Aoshima

[11] Patent Number: 5,283,604
[45] Date of Patent: Feb. 1, 1994

[54] CAMERA WHICH READS INFORMATION FROM A STABILIZED FILM CARTRIDGE

[75] Inventor: Chikara Aoshima, Zama, Japan

[73] Assignee: Canon Kabushiki Kaisha, Tokyo, Japan

[21] Appl. No.: 802,411

[22] Filed: Dec. 4, 1991

[30] Foreign Application Priority Data

Dec. 14, 1990 [JP] Japan .................................. 2-410522
Dec. 14, 1990 [JP] Japan .................................. 2-410523
Dec. 14, 1990 [JP] Japan .................................. 2-410524

[51] Int. Cl.⁵ ................................................ G03B 7/00
[52] U.S. Cl. ................................................ 354/21
[58] Field of Search ................ 354/21, 105, 106, 212, 354/275, 173.1, 173.11

[56] References Cited

U.S. PATENT DOCUMENTS

| | | | |
|---|---|---|---|
| 4,834,306 | 5/1989 | Robertson et al. | 242/71.1 |
| 4,939,531 | 7/1990 | Sawamura et al. | 354/173.1 |
| 4,996,546 | 2/1991 | Pagano et al. | 354/76 |
| 5,025,274 | 6/1991 | Pagano | 354/21 |
| 5,032,854 | 7/1991 | Smart et al. | 354/21 |

Primary Examiner—Michael L. Gellner
Assistant Examiner—Howard B. Blankenship
Attorney, Agent, or Firm—Fitzpatrick, Cella, Harper & Scinto

[57] ABSTRACT

A camera using a film cartridge having an information recording member movable with the rotation of a film feed spool, the camera having an information reader for reading information from the information recording member during rotation of the same, a film feeder for feeding the film, and a controller for substantially starting the reading performed by the information reader after the film feeding performed by the film feeder has been stabilized.

38 Claims, 31 Drawing Sheets

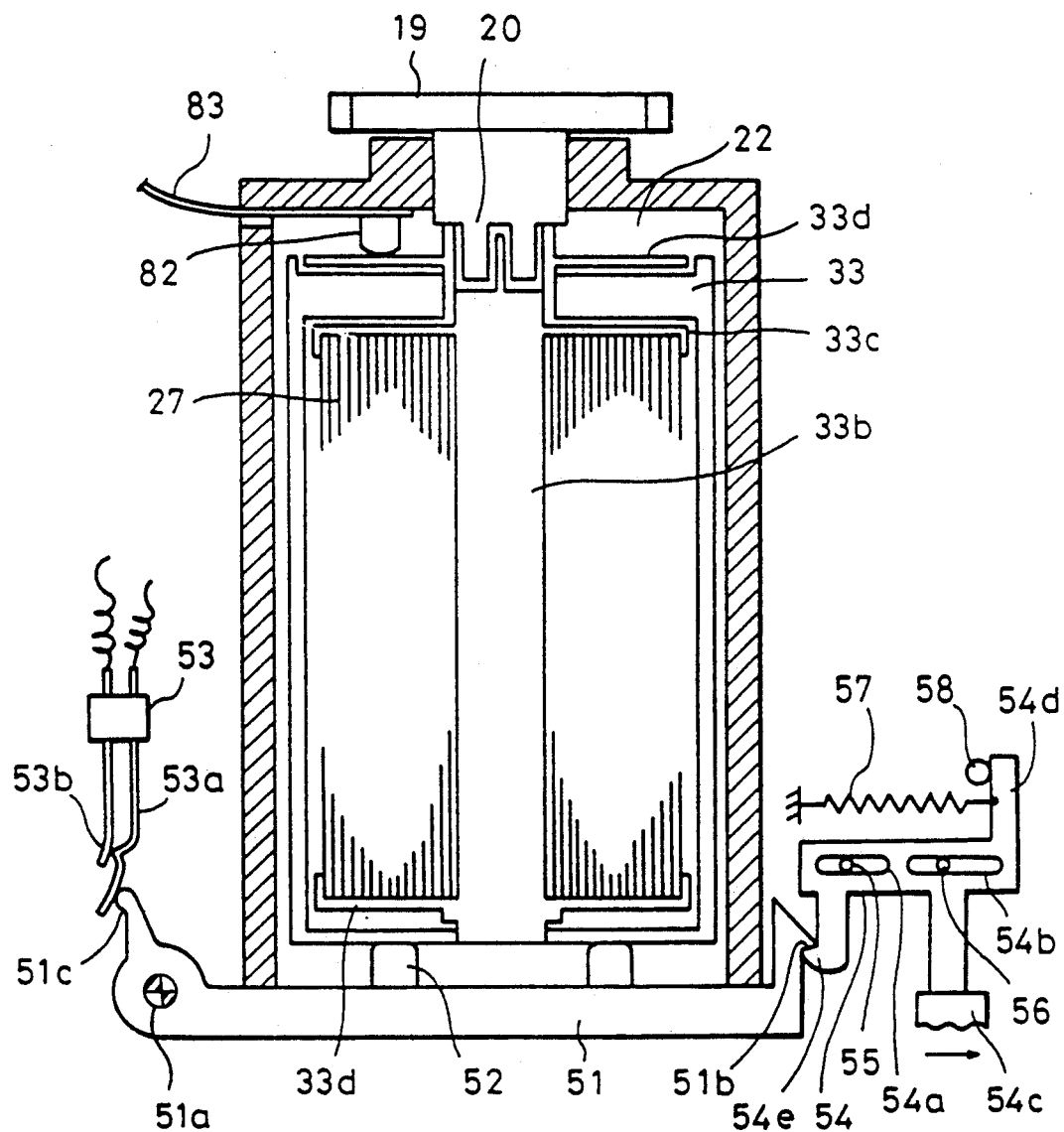

CAMERA WHICH READS INFORMATION FROM A STABILIZED FILM CARTRIDGE

BACKGROUND OF THE INVENTION

1. Field of the Invention

This invention relates to a camera using a film cartridge having a recording disk which is rotatable integrally with a feed spool in the film cartridge and on which encoded information on the film is recorded.

2. Description of the Prior Art

U.S. Pat. No. 5,025,274 discloses a film cartridge in which information on the film (film speed, a specified number of frames, etc.) is recorded as a bar code on a member which moves integrally with film feeding. It is possible to automatically set film information in a camera by designing the camera so that the camera reads the information by an optical means such as a photoreflector during film feeding.

However, in the case of reading film information recorded as a bar code, a fluctuation in feeding speed may be so large that a read error occurs.

In cameras, the film feed speed or the rotational speed of a feed spool in a film cartridge of a camera, i.e., a member which is movable integrally with film feeding, fluctuates. This speed may be abruptly changed at particular times, that is, 1) in the case of driving a film feed means with a motor, during a period of time for increasing the motor speed for steady rotation after starting motor driving;

2) at a time before a film end portion is wrapped around a film take-up spool and for a time after the completion of the wrapping;

3) in the case of a camera having a magnetic head for writing or reading information and being movable along a plane parallel to a film surface in a direction perpendicular to a film traveling direction while allowing a magnetic recording portion of the film to slide thereover, a guide member constructed integrally with the magnetic head to limit the position of a widthwise end surface of the film with respect to the head, and an elastic member for bringing this guide member closer to the widthwise end surfaces of the film, at the time of contact of a film end portion with the guide member during passage over the guide member; and 4) in the case of a camera having a magnetic head allowing a magnetic recording portion of a film to slide thereover to write or read information, and a pressure contact means for bringing the magnetic recording portion of the film in pressure contact with the magnetic head, when a film end portion contacts the magnetic head or when the pressure contact means passes over the magnetic head.

SUMMARY OF THE INVENTION

In view of these circumstances, an object of the present invention is to provide a camera using a film cartridge having an information recording member movable with the rotation of a film feed spool, the camera comprising information reading means for reading information from the information recording member during rotation of the same, film feed means for feeding a film in the film cartridge at a traveling speed, and control means for controlling the reading performed by the information reading means, wherein the reading is started a predetermined time period after the film feeding is initiated by the film feed means so that the film feeding is stabilized. In this manner, information can be read from the information recording member with improved reliability.

Other objects of the present invention will become apparent from the following description of the embodiments of the invention.

BRIEF DESCRIPTION OF THE DRAWINGS

FIG. 39 is a diagram of the construction of a cartridge chamber and a portion in the vicinity of this chamber of a camera in accordance with an eighth embodiment of the present invention.

DESCRIPTION OF THE PREFERRED EMBODIMENTS

Embodiments of the present invention will be described below with reference to the accompanying drawings.

Figure 2:
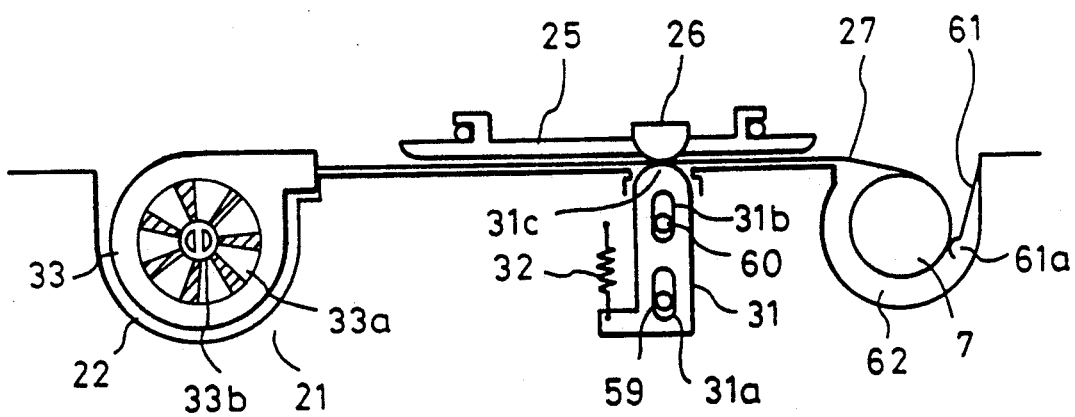
FIG. 2 is a diagram of the mechanism of an essential portion of the camera shown in FIG. 1.
Figure 3:
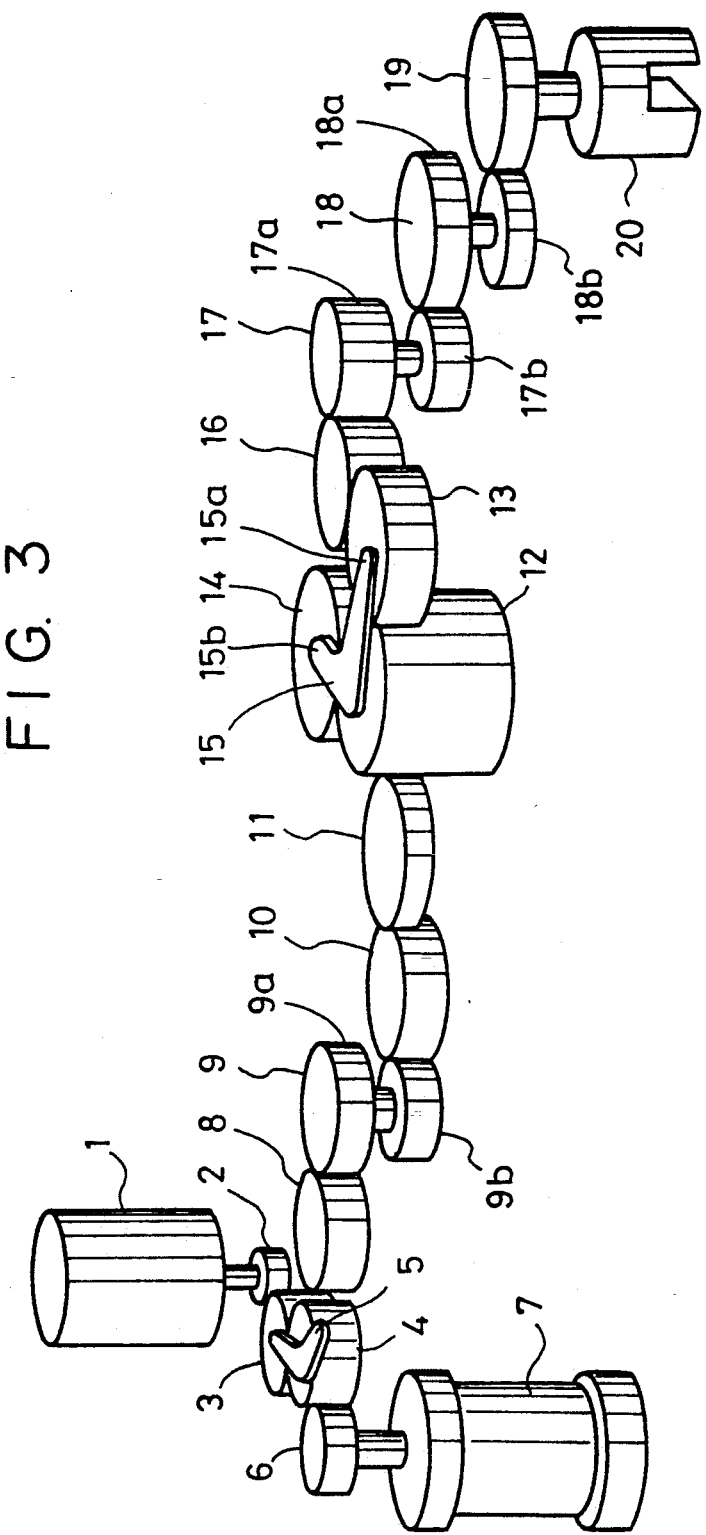
FIG. 3 is a perspective view of a film feed mechanism of the camera shown in FIG. 1.
Figure 4:
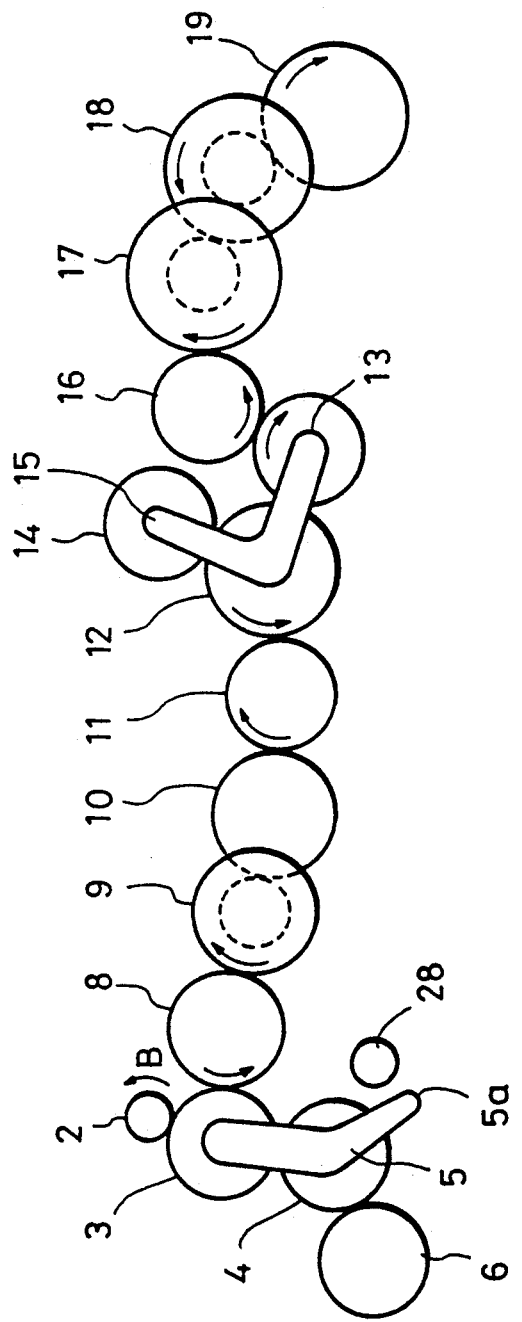
FIG. 4 is a plan view of a gear train at the time of film winding of the camera shown in FIG. 1.
Figure 5:
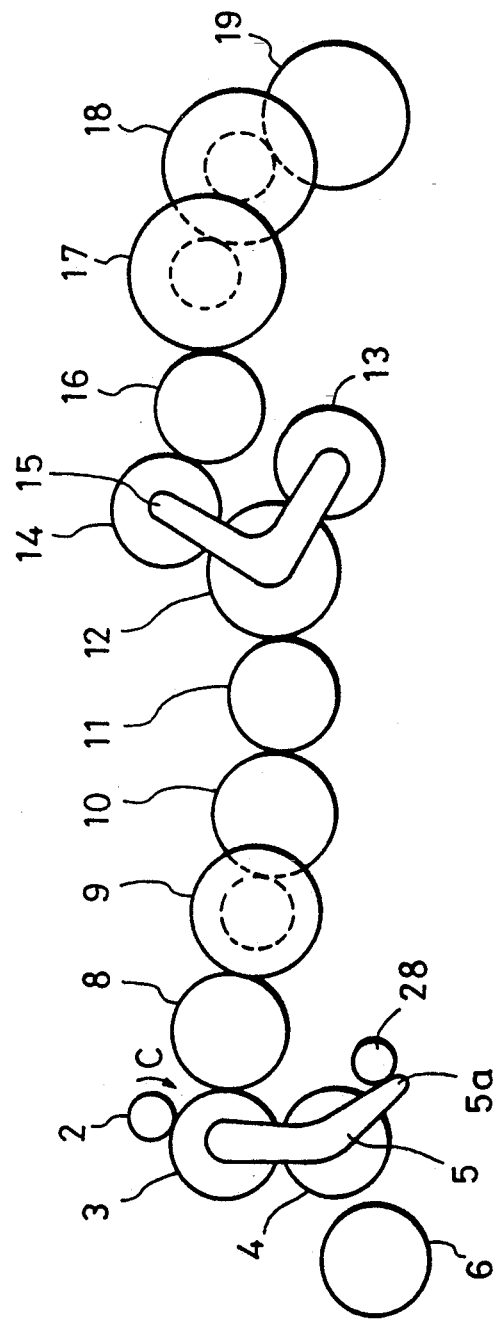
FIG. 5 is a plan view of the gear train at the time of film rewinding of the camera shown in FIG. 1.
Figure 6:
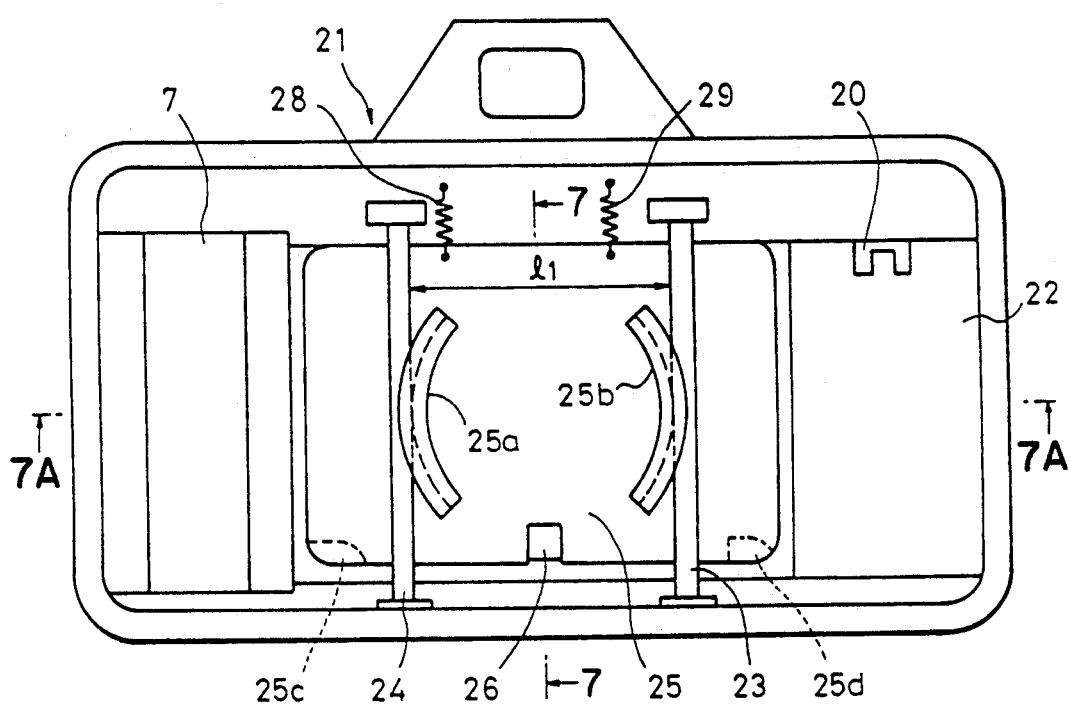
FIG. 6 is a rear elevation of the camera shown in FIG. 1, in which the camera back is omitted.
Figure 7:
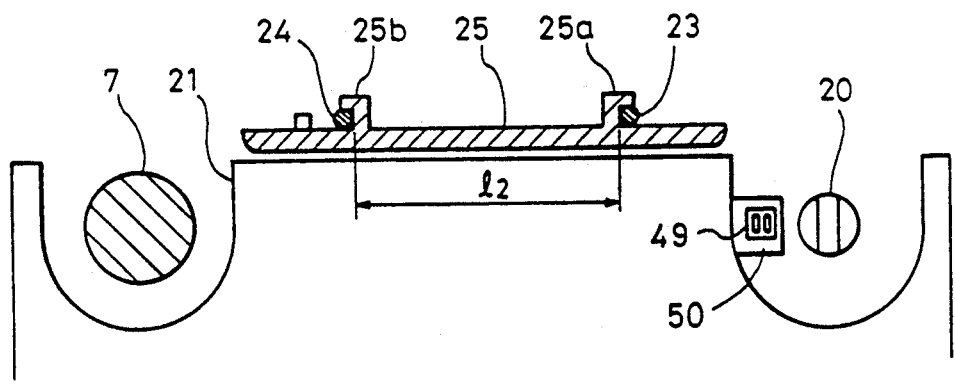
FIG. 7 is a cross-sectional view taken along the line A—A of FIG. 6.
Figure 8:
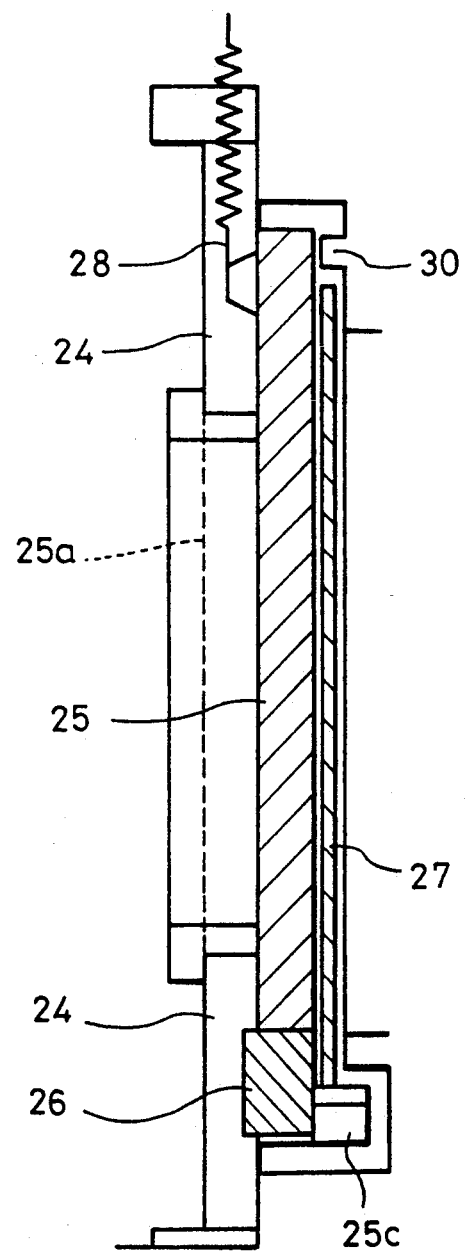
FIG. 8 is a cross-sectional view taken along the line B—B of FIG. 6.

FIGS. 2 to 8 show mechanical construction of a camera in accordance with the first embodiment of the present invention; FIG. 2 is a transverse sectional view of an essential portion of the camera; FIG. 3 is a perspective view of a film feed mechanism; FIG. 4 is a plan view of a gear train at the time of film winding; FIG. 5 is a plan view of the gear train at the time of film rewinding; FIG. 6 is a rear elevation of the camera in which the camera back is not shown; FIG. 7 is a cross-sectional view taken along the line A—A of FIG. 6; and FIG. 8 is a cross-sectional view taken along the line B—B of FIG. 6.

A film driving motor 1 is rotated in a normal, or forward, direction (in the direction of arrow B in FIG. 4) when the film is wound and is rotated in a reverse direction (in the direction of arrow C of FIG. 5) when the film is rewound. A pinion gear 2 is fixed to the rotating shaft of the motor 1. A first sun gear 3 meshes with the pinion gear 2. A first planetary gear 4 meshes with the first sun gear 3. A first connection lever 5 connects the first sun gear 3 and the first planetary gear 4 and rotatably supports the first planetary gear 4 while generating a frictional force therewith, so that the first planetary gear 4 revolves around the first sun gear 3 as the first sun gear 3 rotates. The first sun gear 3, the first planetary gear 4 and the first connection lever 5 constitute a planetary gear mechanism which is known per se. A spool gear 6 meshes with the first planetary gear 4 only when the film driving motor 1 rotates in the normal direction. A film take-up spool 7 is fixed to the spool gear 6 to be moved integrally with the spool gear 6.

A first idler gear 8 always meshes with the first sun gear 3. A first dual gear 9 has a large toothed (large diameter) portion 9a and small toothed (small diameter) portion 9b. The large toothed portion 9a of the first dual gear 9 meshes with the idler gear 8. A second idler gear 10 meshes with the small toothed portion 9b of the first dual gear 9. A third idler gear 11 meshes with the second idler gear 10 and with a second sun gear 12. A second planetary gear 13 meshes with the second sun gear 12. A third planetary gear 14 meshes with the second sun gear 12 like the second planetary gear 13. A second connection lever 15 has arms 15a and 15b which respectively connect the second sun gear 12 with the second planetary gear 13 and the third planetary gear 14, and rotatably holds these planetary gears while generating frictional forces between them, so that as the second sun gear 12 rotates, the second and third planetary gears 13 and 14 revolve around the second sun gear 12. The second sun gear 12, the second and third planetary gears 13 and 14 and the connection lever 15 constitute a planetary gear mechanism which is known per se.

A fourth idler gear 16 meshes with the second planetary gear 13 when the film driving motor 1 rotates in the normal direction and when the second connection lever 15 thereby rotates counterclockwise on the second sun gear 12. At this time the idler gear 16 does not mesh with the third planetary gear 14. When the motor 1 rotates in the reverse direction, the fourth idler gear 16 meshes with the third planetary gear 14 and does not mesh with the second planetary gear 13. A second dual gear 17 has a large toothed portion 17a and a small toothed portion 17b, with the large toothed portion 17a meshing with the fourth idler 16. A third dual gear 18 has a large toothed portion 18a and a small toothed portion 18b, with the large toothed portion 18a meshing with the small toothed portion 17b of the second dual gear 17. A fork gear 19 meshes with the small toothed portion 18b of the third dual gear 18. A fork 20 is rotated integrally with the fork gear 19 to rotate a feed spool 33b in a film cartridge 33 (FIG. 2) so that a film 27 is extruded from or rewound in the cartridge 33.

In a camera body 21 (FIG. 6) are provided a cartridge chamber 22 and support shafts 23 and 24 each having two ends fixed to suitable portions of the camera body 21. The support shafts 23 and 24 are parallel to each other and are perpendicular to the direction in which the film 27 travels. In this embodiment, the support shafts have a cylindrical shape circular in section, as shown in FIG. 7.

A pressure plate 25 has a pair of engagement portions 25a and 25b on its upper surface (opposite to the surface which is brought into contact with film 27), as shown in FIG. 7. Each of the engagement portions 25a and 25b is formed of a portion perpendicular to the pressure plate 25 and a horizontal portion bent perpendicularly and outwardly from the perpendicular portion, has a generally L-shaped section, and generally projects along the optical axis. The engagement portions 25a and 25b have circular-arc shapes symmetrical with respect to a point generally corresponding to the center of the pressure plate 25, as viewed in the plan of FIG. 6.

The distance $l_2$ between outer surfaces of the perpendicular portions of the engagement portions 25a and 25b (FIG. 7) is set so as to be slightly smaller than the distance $l_1$ between inner surfaces of the support shafts 23 and 24 (FIG. 6). The support shafts 23 and 24 are positioned in recessed spaces formed between the perpendicular and horizontal portions of the engagement portions 25a and 25b of the pressure plate. The pressure plate 25 is therefore movable relative to the support shafts 23 and 24 in a vertical direction as shown in FIG. 6 (in a direction perpendicular to the direction in which film 27 travels) and is rotatable generally on the center of the pressure plate 25. The horizontal portions of the engagement portions 25a and 25b pinch the support shafts 23 and 24 to limit the position of the pressure plate 25 in the direction of the optical axis, as shown in FIG. 7.

As shown in FIG. 6, guide members 25c and 25d are integrally formed on lower corner portions of the reverse surfaces of the pressure plate 25. As shown in FIG. 8, a magnetic head 26 is fixed on a lower portion of the pressure plate. A head gap of the magnetic head 26 is perpendicular to the film traveling direction.

Springs 28 and 29 are respectively disposed on the cartridge chamber 22 side and the film take-up spool 7 side with respect to the center of rotation of the pressure plate 25. One end of each of the springs 28 and 29 is fixed to the camera body 21 while the other end is fixed to the pressure plate 25, thereby upwardly urging the pressure plate 25. The guide members 25c and 25d provided on the pressure plate 25 are thereby pressed against an end surface of the film 27 so that the position of the pressure plate 25 relative to the film 27 is constantly maintained. A magnetic recording region (not shown) is formed on the surface of the film 27 facing the pressure plate 25, and various information items relating to photography are written on (or read from) this region with the magnetic head 26. An outer rail 30 (FIG. 8) limits the upper position of the film 27.

As shown in FIG. 6, surfaces tapered in the direction of the cartridge chamber 22 are formed on the guide members 25c and 25b to enable the film 27 drawn out of the film cartridge 33 set in the cartridge chamber 22 to smoothly move the guide members 25c and 25b downward against the urging force of the springs 28 and 29.

A pressing lever 31 (FIG. 2) is disposed in a position such as to face the magnetic head 26 with the film 27 interposed therebetween. The pressing lever 31 is attached in such a manner that dowels 59 and 60 of the camera body 21 are slidably fitted in elongated holes 31a and 31b of the pressing lever 31. The pressing lever 31 is urged by a spring 32 having one end attached to the camera body 21 so that a pressing portion 31c presses the film 27 against the magnetic head 26. A roller plate 61 (FIG. 2) formed of a flexible material is attached at its one end to an inner wall of a spool chamber 62. The roller plate 61 has a portion 61a for pressing against the film take-up spool 7. The roller plate 61 serves to facilitate wrapping of the film 27 around the film take-up spool 7 at the time of automatic loading of the film 27.

Figure 9:
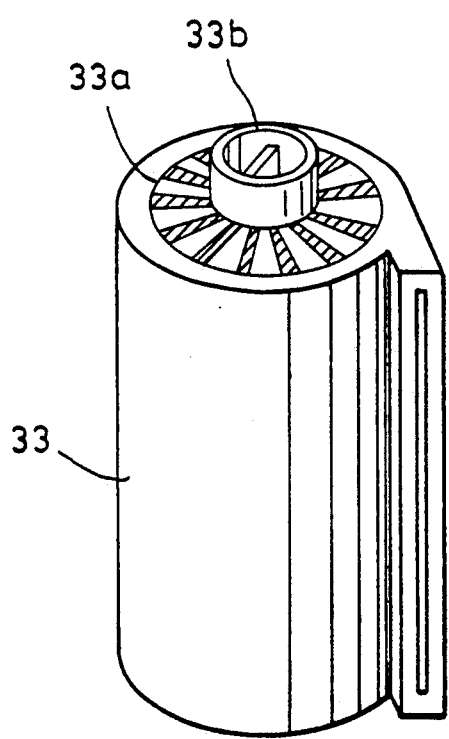
FIG. 9 is a perspective view of a film cartridge for use in the camera shown in FIG. 1.

FIG. 9 shows the film cartridge 33 for use in the camera in accordance with this embodiment. A reference symbol 33a in FIG. 9 denotes a bar code disk on which film information on the film sensitivity, the specified number of film frames, the type of the film, etc. are encoded and expressed as a bar code, and which is rotated integrally with the feed spool 33b.

The film cartridge 33 is constructed as described below. As disclosed in U.S. Pat. No. 4,834,306, this type of film cartridge has a film passage slit, a film fixed at its one end to the feed spool and wound around the feed spool, retaining members disposed coaxially with the feed spool and having limiting portions for limiting radial expansion of an outermost film portion to prevent the outermost film portion from substantially contacting the inner wall of the film cartridge, a release section for deforming a portion of the retaining member to continuously release the outermost film portion from the state of being retained in the radial direction by the retaining member, and a guide section for guiding the film portion released from the retained state to the film passage slit. The winding of the film can be loosened by the rotation of the feed spool in the film extruding direction to apply an extruding force to the film while preventing slippage between the outermost portion of the film and the retaining member by the expansion of the outermost portion, thereby enabling the film to be extruded from the film cartridge.

If this extrusion type film cartridge 33 is used, it is possible to feed film 27 without performing a troublesome operation for setting the film in the camera and thereafter setting the film end in the predetermined position, that is, the feed spool 33b of the cartridge is rotated by the fork 20 so that film 27 is extruded until it is wrapped around the film take-up spool 7, and film 27 is thereafter fed by the film take-up spool 7.

Figure 10:
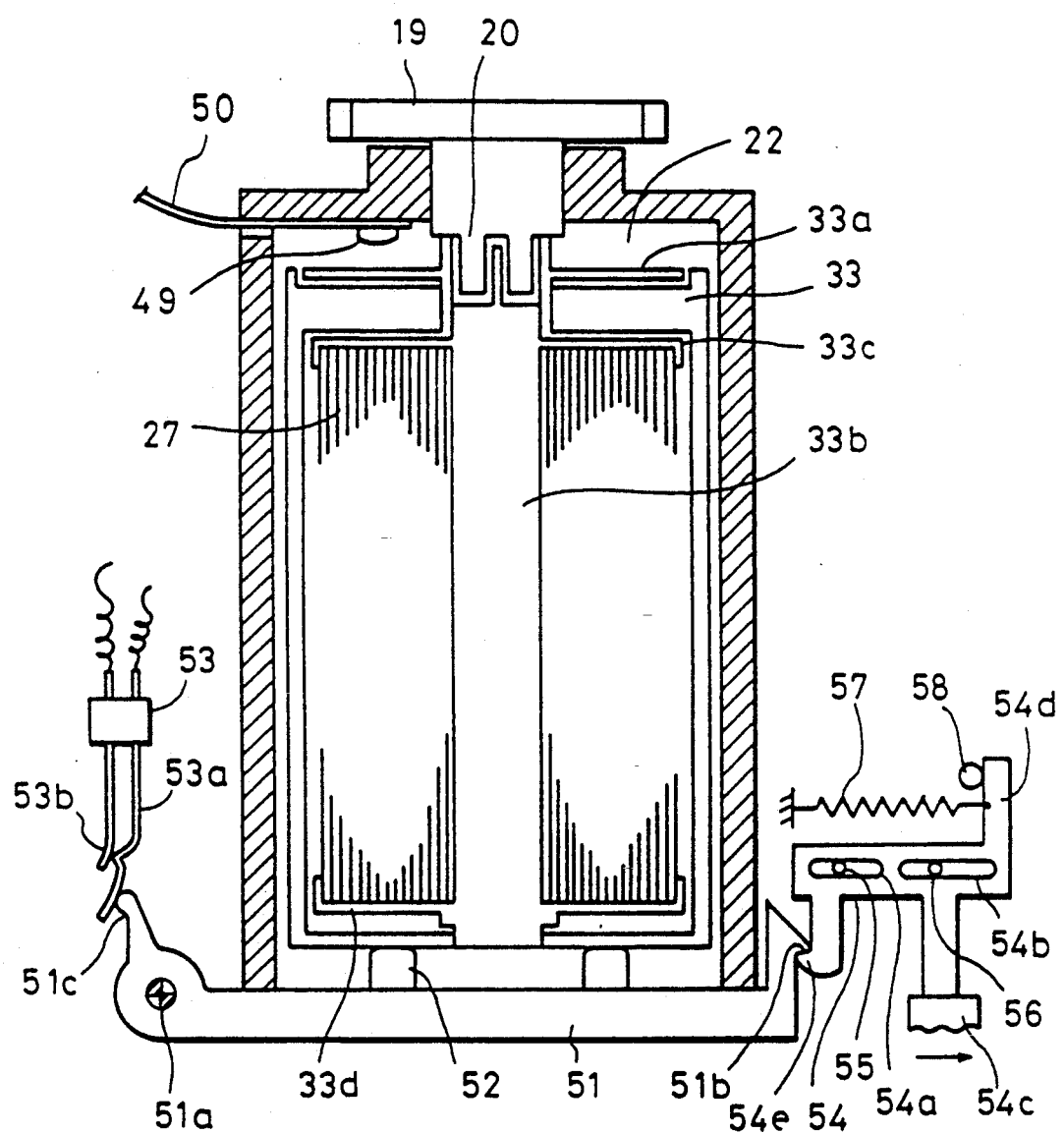
FIG. 10 is a diagram of the construction of a cartridge chamber and a portion in the vicinity of this chamber of the camera shown in FIG. 1.

FIG. 10 is a longitudinal sectional view of a state in which the above-described film cartridge 33 is set in the cartridge chamber 22.

Members 33c and 33d shown in FIG. 10 are formed of a flexible material and correspond to the above-mentioned retaining members. A photoreflector 49 is used to optically read information on the film written on the bar code disk 33a when this disk is rotated. The photoreflector 49 is attached to an inner wall of the cartridge chamber 35, and is mounted on a flexible printed circuit board 50, through which signal for driving the photoreflector 49 and a read signal output from the photoreflector are exchanged with a later-described control circuit through a later-described photoreflector control circuit. A cartridge cover 51 is attached to the camera body so as to be swingable on its shaft 51a. A cartridge pressing member 52 formed of an elastic material is fixed to the cartridge cover 51 to press the film cartridge 33 upward to position the same, when the cartridge cover 51 is closed, as shown in FIG. 10.

A cartridge cover switch 53 is operated to inform the later-described control circuit that the cartridge cover 51 is closed by electrical connection between contact pieces 53a and 53b. A portion 51c of the cartridge cover 51 can be moved while abutting against the contact piece 53a. When the cartridge cover 51 is closed, the portion 51c is brought into abutment against the contact piece 53a to make the contact piece 53a contact the contact piece 53b. When the cartridge cover 51 is open, the contact pieces 53a and 53b do not contact each other. A cartridge cover opening/closing lever 54 is slidable on the camera body with its elongated holes 54a and 54b fitted to dowels 55 and 56 of the camera body. The cartridge cover opening/closing lever 54 has a manual operation portion 54c and a claw portion 54e. A spring 57 is attached at its one end to the camera body and at the other end to the cartridge cover opening/closing lever 54 to urge the cartridge cover opening/closing lever 54 in a direction opposite to the arrow. A stopper provided on the camera body limits the position of the cartridge cover opening/closing lever 54 on the left-hand side. The claw portion 54e is engagable with a portion 51b of the cartridge cover 51. In the state shown in FIG. 10, these portions are engaged to maintain the closed position of the cartridge cover 51.

In the camera constructed as described above, first sun gear 3 rotates clockwise when film driving motor 1 (pinion gear 2) is rotated in the direction of the arrow B (normal direction) as shown in FIG. 4 after film cartridge 33 has been set in cartridge chamber 22. With this rotation, first planetary gear 4 revolves clockwise on first sun gear 3 by the operation of first connection lever 5 and then starts meshing with spool gear 6. A driving force of the film driving motor 1 is thereby transmitted to spool gear 6, so that film take-up spool 7 rotates in the clockwise direction.

Another driving force is transmitted from the motor to second sun gear 12 through idler gear 8, which is another gear meshing with first sun gear 3, and through first dual gear 9, second idler gear 10 and third idler gear 11. Second sun gear 12 is thereby rotated counterclockwise, second planetary gear 13 and the third planetary gear 14 are rotated counterclockwise on the second sun gear 12 by the operation of second connection lever 15, and second planetary gear 13 then starts meshing with fourth idler gear 16. The driving force of film driving motor 1 in direction B is thereby transmitted to fourth idler gear 16 as a counterclockwise driving force, and is further transmitted to fork gear 19 through second dual gear 17 and third dual gear 18, so that fork 20 is rotated in the clockwise direction.

The gear ratio of this gear train is selected as described below.

If the peripheral speed of film take-up spool 7 is V1 and the speed at which film 27 is extruded from film cartridge 33 by fork 20 is V2, then a relationship V1 > V2 is established.

Figure 11:
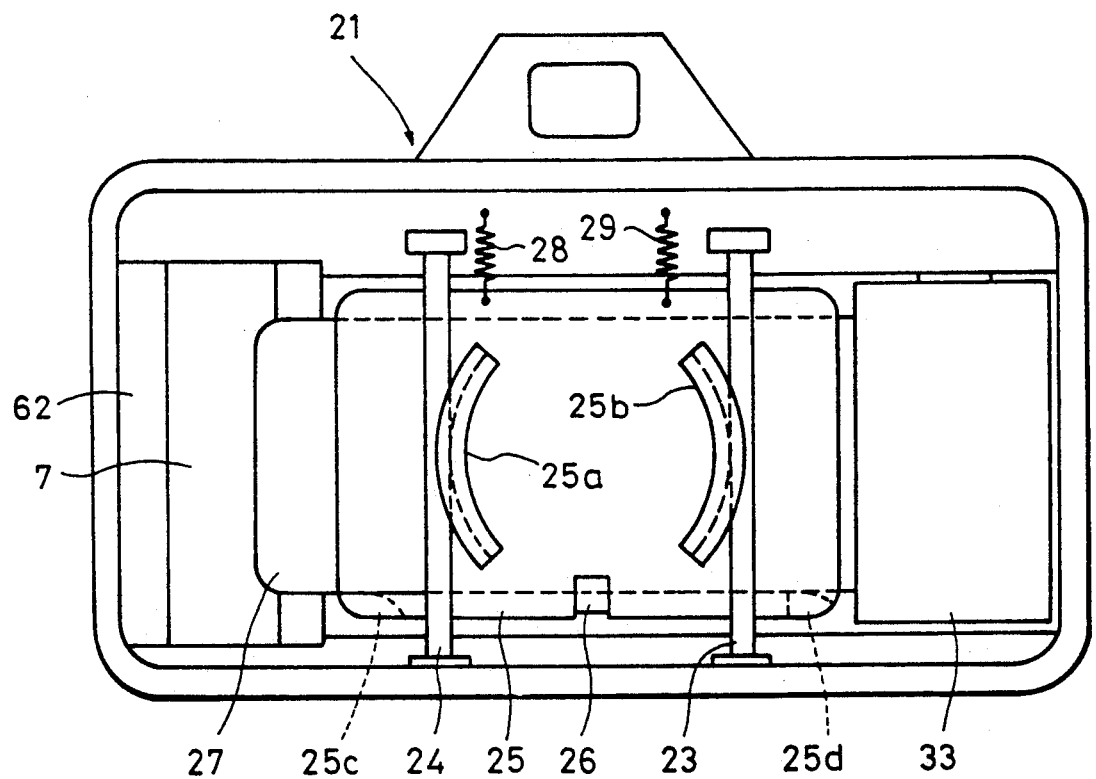
FIG. 11 is a rear elevation of a film feeding state of the camera shown in FIG. 1, in which the camera back is omitted.

As film 27 is extruded from film cartridge 33 by the clockwise rotation of fork 20, the film end enters the gap between pressure plate 25 and camera body 21. As film 27 is further moved toward spool chamber 62, the film end is brought into contact with and passes over guide member 25d by downwardly pressing the same against the urging force of spring 29. Thus, film 27 and pressure plate 25 are positioned relatively by spring 29 and guide member 25d on the right-hand side. With a further movement of film 27, the film end reaches the position of magnetic head 26. Since pressing lever 31 is designed to constantly press film 27 against magnetic head 26 by means of spring 32, the film end enters the gap between portion 31c of pressing lever 31 and magnetic head 26 against the urging force of spring 32 when brought into contact with portion 31c and magnetic head 26. As film 27 is further moved, the film end is brought into contact with and passes over guide member 25c by downwardly pressing the same against the urging force of spring 28. Thus, film 27 and pressure plate 25 are positioned relatively by spring 28 and guide member 25c on the left-hand side. At this time, photography information can be written or read out since magnetic head 26 and the unillustrated magnetic recording portion of film 27 are in sliding contact with each other. FIG. 11 shows a state in which this positioning is completed. The film end is wrapped round film take-up spool 7 at the end of this film feeding. Thereafter, film 27 is wound only by the rotation of film take-up spool 7 rotated by film driving motor 1 for a reason described below.

When the film is wrapped around the film take-up spool 7, the torque of the film take-up spool 7 is transmitted through film 27 and through fork gear 19, third dual gear 18, second dual gear 17 and fourth idler gear 16, and the counterclockwise rotational speed of fourth idler gear 16 becomes higher than the clockwise rotational speed of second planetary gear 13 in accordance with the relationship V1 > V2. At this time, however, fourth idler gear 16 repels second planetary gear 13 so that second planetary gear 13 and fourth idler gear 16 are released from the meshing state for an instant, and thereby the difference between the speeds is absorbed.

Accordingly, the film 27 feed speed is changed from V2 to V1 when film 27 is wrapped around film take-up spool 7. Film 27 is wrapped around film take-up spool 7 by well-known means (such as claws provided on film take-up spool 7 to hitch film 27 by perforation holes formed in film 27, or a roller plate 61 provided on the camera body to press film 27 against film take-up spool 7).

Even if meandering of film 27 occurs during film feeding, pressure plate 25 can accurately follow it since pressure plate 25 is movable relative to camera body 21 perpendicularly to the film traveling direction and rotatable on a plane parallel to the surface of film 27, and since guide members 25c and 25d of pressure plate 25 press the film end surface by springs 28 and 29. At this time, the head gap of magnetic head 26 is in constant contact with the magnetic recording portion of film 27, since magnetic head 26 is integral with pressure plate 25, and since guide members 25c and 25d provided on pressure plate 25 are maintained in contact with the lower end of film 27 by springs 28 and 29.

Thereafter, positioning the first frame and winding to the next frame are conducted, which will be described later. The operation of rewinding the film will be described below.

Referring to FIG. 5, as film driving motor 1 rotates in the direction of arrow C, first connection lever 5 and first planetary gear 4 revolve counterclockwise on first sun gear 3 until end 5a of first connection lever 5 is brought into abutment against stopper 28. First planetary gear 4 and spool gear 6 are thereby released from the state of meshing with each other.

Also, second sun gear 12 rotates clockwise, and second planetary gear 13 and third planetary gear 14 revolve on second sun gear 12 by the operation of second connection lever 15, so that fourth idler gear 16 and second planetary gear 13 are released from the state of meshing with each other while fourth idler gear 16 and third planetary gear 14 start meshing each other. Fork gear 19 therefore rotates counterclockwise, and feed spool 33b in film cartridge 33 is rotated in the reverse direction by the fork 20, so that film 27 is rewound into cartridge 33.

Figure 1:
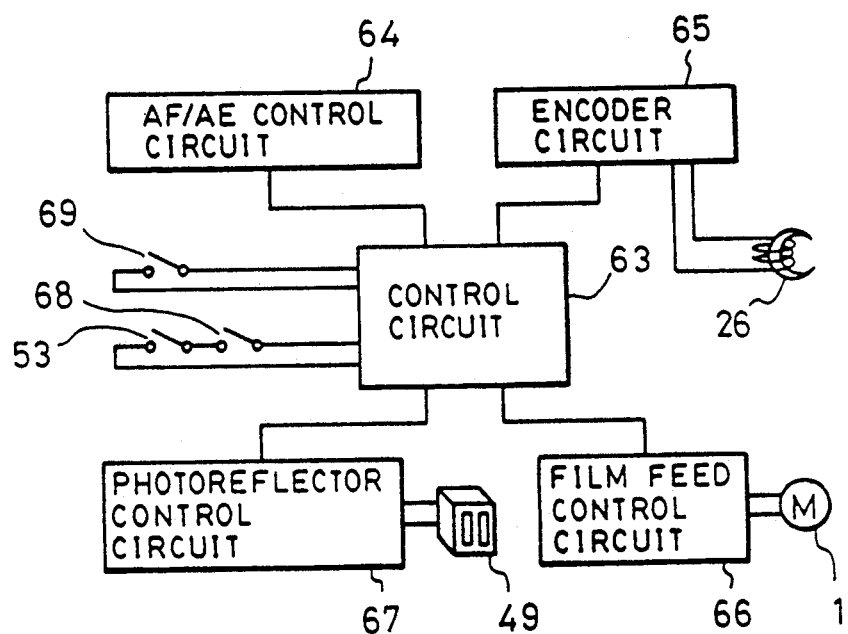
FIG. 1 is a diagram of electrical blocks of a camera in accordance with a first embodiment of the present invention.

FIG. 1 is a diagram of electrical blocks of the camera in accordance with this embodiment. Each of the elements shown in block outline in FIG. 1, as well as in FIGS. 20 to 29, is well known per se, and a specific type of construction is not critical to carrying out the invention or to a disclosure of the best mode for carrying out the invention.

A control circuit 63 shown in FIG. 1 is comprised of a microcomputer or the like and serves for overall camera operation control. An AF/AE control circuit 64 including a distance metering circuit for measuring the distance to a subject and a photometry circuit for measuring the luminance of the subject serves to focus an unillustrated picture-taking lens and open/close the shutter so as to control exposure of film 27 according to the luminance of the field. A magnetic head encoder circuit 65 drives magnetic head 26 to write information on the magnetic recording portion of film 27 or read information from this portion. A photoreflector control circuit 67 operates photoreflector 49 to read information on the film during rotation of the bar code disk 33a. A cartridge detection switch 68 is turned on when film cartridge 33 is set in cartridge chamber 22. A cartridge cover opening/closing switch 53 is connected in series to the cartridge detection switch 68 to detect opening/closing of cartridge cover 51. A release switch 69 is manually turned on to start the shutter release operation.

Figure 12:
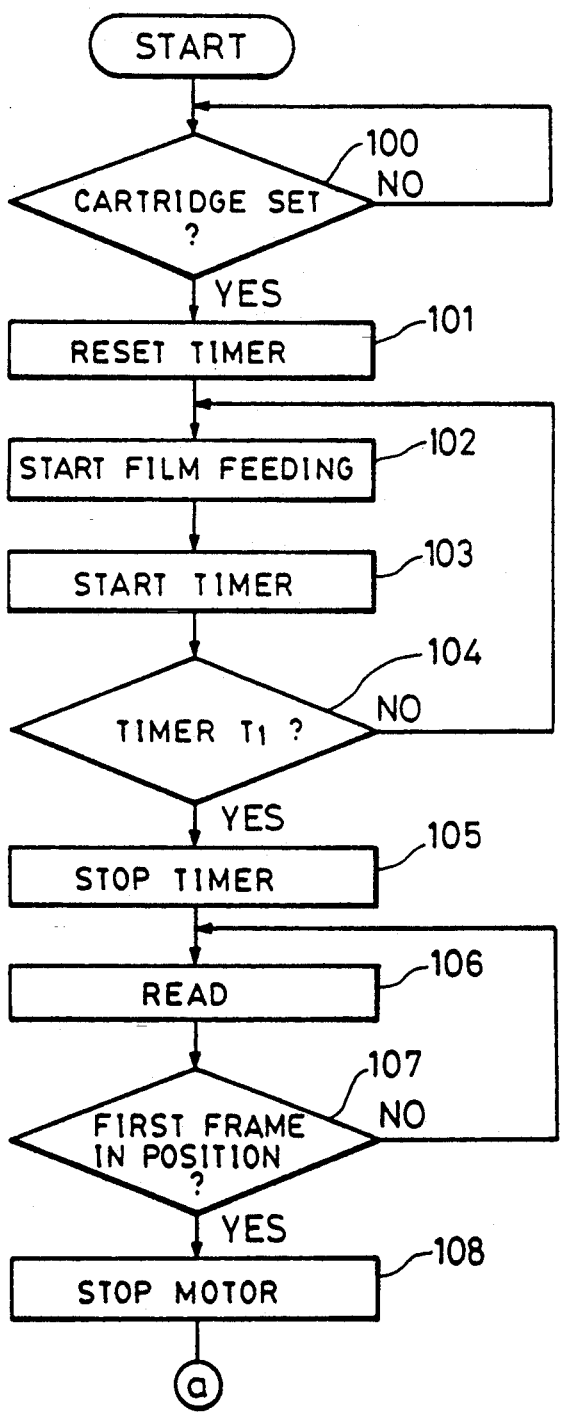
FIG. 12 is a flow chart of a part of the operation of the control circuit shown in FIG. 1.

The operation of the control circuit 63 will be described below with reference to the flow charts of FIGS. 12 and 13.

[Step 100] Film cartridge 33 is set in cartridge chamber 22, and cartridge cover 51 is closed. Both cartridge cover opening/closing switch 53 and cartridge detection switch 68 are thereby turned on, and control circuit 63 determines that film cartridge 33 has been set in the camera from these switch operations. The process then proceeds to step 101.

[Step 101] An internal timer is reset.

[Step 102] Since film cartridge 33 has been set, a winding start signal is sent to film feed control circuit 66 in this step. Film driving motor 1 is thereby rotated in the direction B as shown in FIG. 4 to start extruding film 27 from film cartridge 33 by means of the above-described gear train.

[Step 103] Immediately after sending the winding start signal to film feed control circuit 66, the operation of counting the time is started.

In step 102, film driving motor 1 is driven by film feed control circuit 66 to start rotating and feed spool 33b and bar code disk 33a in film cartridge 33 are thereby rotated. However, a certain length of time is required to increase the rotational speed of bar code disk 33b to a steady speed and to stably maintain the rotation at this speed after the time when the winding start signal is output, because of rising characteristics of motor 1, an inertial force of the gear train, a backlash of the gear train, the play of fork 20 and feed spool 33b and other causes. This length of time, i.e., the time taken before the bar cord disk 33b rotates in the steady state is set as "Ta".

[Step 104] Determination is made as to whether the timer has counted to a predetermined time T1 (T1≧Ta). If NO, the process returns to step 102. If the predetermined time T1 is reached, the process proceeds to step 105.

[Step 105] The counting operation of the timer is stopped.

[Step 106] Since at this time bar code disk 33a is rotating at the stabilized speed, photoreflector control circuit 67 is operated to read, with photoreflector 49, information on the film written on bar code disk 33a, e.g., the specified number of film frames, the film speed and the kind of film.

[Step 107] The amount of film feeding is calculated by a well-known means, e.g., counting unillustrated perforation holes formed in film 27 with an unillustrated photointerrupter, counting the number of revolutions of an unillustrated roller pressed on film 27 with a pulse plate or the like, or calculation from the time for driving of film driving motor 1 to determine whether or not the first frame has reached the position corresponding to the aperture. Film feeding is continued until the first frame reaches this position. If it is determined that the first frame has reached the position at the aperture, the process proceeds to step 108.

[Step 108] Driving of film driving motor 1 is stopped through film feed control circuit 66 to stop winding the film.

Figure 13:
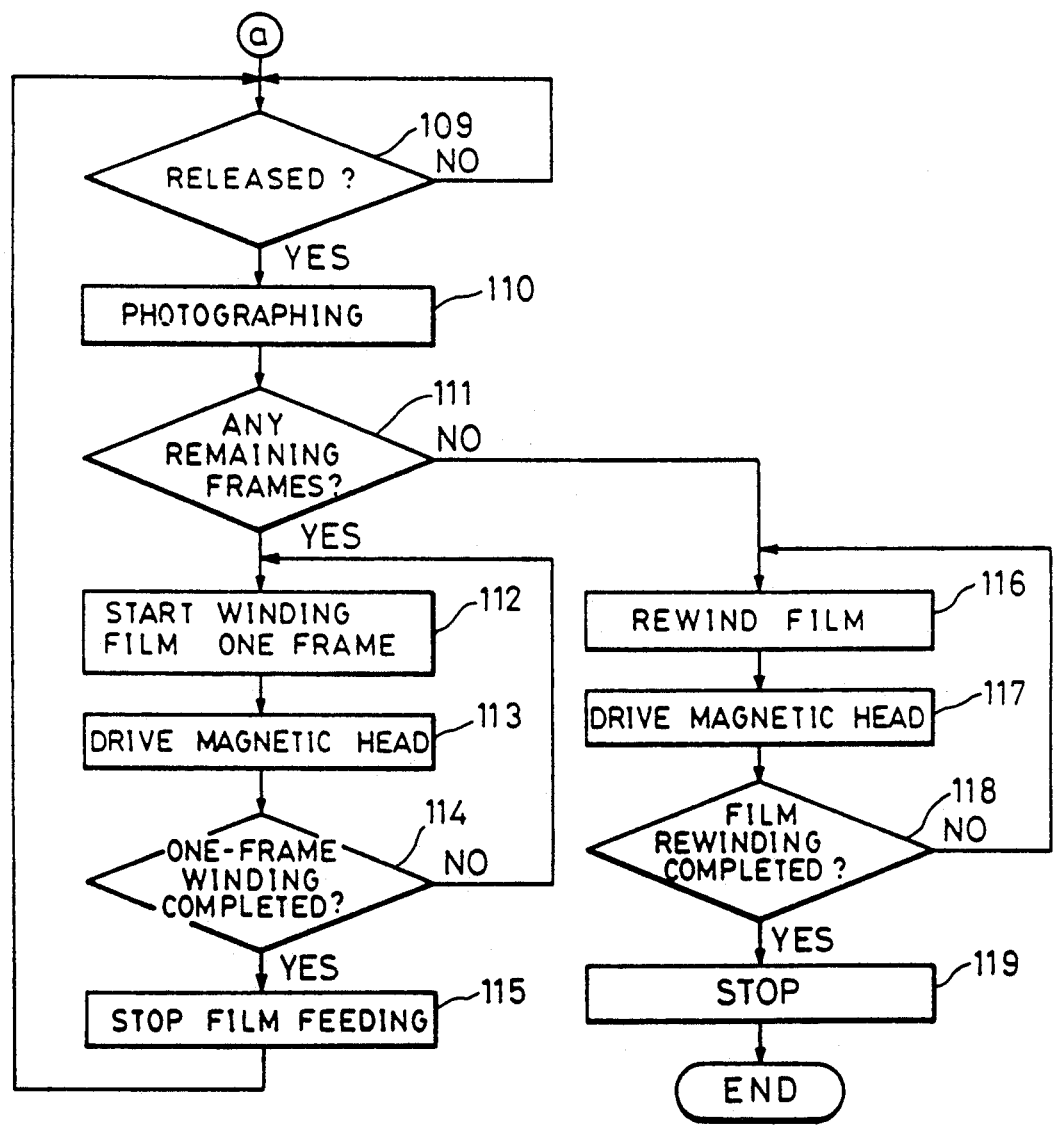
FIG. 13 is a flow chart continued from FIG. 12.

When the above operations are finished, the process proceeds to step 109 shown in FIG. 13.

[Step 109] Determination is made as to whether or not the unillustrated release button has been depressed so that switch 69 is turned on. If it is determined that switch 69 has been turned on, the process proceeds to step 110.

[Step 110] AF/AE control circuit 64 is operated to measure the luminance of the subject and to calculate information on the distance to the subject (distance metering information), and photographing operations including the operation of focusing the unillustrated lens and the exposure operation based on shutter control are performed based on the information obtained by AF/AE control circuit 64.

[Step 111] The number of release operations, the amount of film feeding or the like are compared with the specified number of film frames read out in step 106 to determine whether there are any remaining frames. If there is no remaining frame, the process proceeds to step 116. If there are some remaining frames, the process proceeds to step 112.

[Step 112] Film feed control circuit 66 is operated to start winding to set the next frame.

[Step 113] During the operation of winding film 27 for the next frame, magnetic head 26 is driven through magnetic head driving circuit 65 to write photography information (shutter speed, aperture value, date, etc.) obtained in step 110 on the magnetic recording portion of film 27.

[Step 114] Determination is made as to whether or not film 27 has been wound by one frame by, for example, counting perforation holes in film 27 with an unillustrated photointerrupter or counting the number of revolutions of a roller pressed on film 27, as mentioned above. If it is determined that film 27 has been wound by one frame, the process proceeds to step 115.

[Step 115] Driving of film driving motor 1 is stopped through film feed control circuit 66 to stop winding film 27, and the process returns to step 109.

[Step 116] Since there are no remaining frames of film 27, film driving motor 1 is driven in the direction of arrow C of FIG. 5 (film rewinding direction) through film feed control circuit 66 to start rewinding film 27 (winding into film cartridge 33).

[Step 117] During the operation of rewinding film 27 into film cartridge 33, magnetic head 26 is driven through magnetic head driving circuit 65 to write photography information (shutter speed, aperture value, date, etc.) obtained in step 110 on the magnetic recording portion of the final photographed frame of film 27.

[Step 118] Determination is made as to whether or not film 27 has been completely rewound into film cartridge 33 by using well-known means, e.g., detecting input of a signal supplied from an unillustrated input means by user's judgment, an elapse of time for film rewinding, or detecting the position of film 27 with the photocoupler as mentioned above. If the completion of rewinding is detected, the process proceeds to step 119. If the completion of rewinding is not detected, the process returns to step 116.

[Step 119] Driving of film driving motor 1 is stopped through film feed control circuit 66, and the overall camera operation is thereafter stopped.

Figure 14:
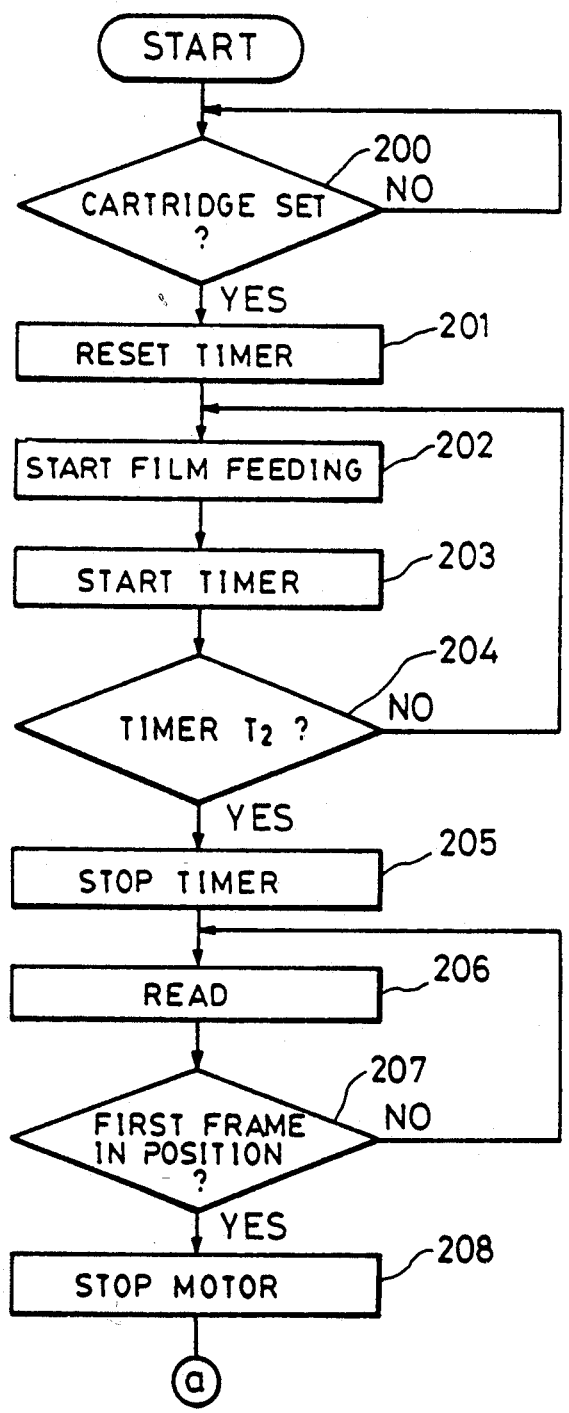
FIG. 14 is a flow chart of a part of another example of the operation of the control circuit shown in FIG. 1.

Another example of the operation of control circuit 63 will be described below with reference to FIGS. 14 and 15.

[Step 200] Film cartridge 33 is set in cartridge chamber 22, and cartridge cover 51 is closed. Both cartridge cover opening/closing switch 53 and cartridge detection switch 68 are thereby turned on, and control circuit 63 determines that film cartridge 33 has been set in the camera from these switch operations. The process then proceeds to step 201.

[Step 201] An internal timer is reset.

[Step 202] Since film cartridge 3 has been set, a winding start signal is sent to film feed control circuit 66 in this step. Film driving motor 1 is thereby rotated in the direction B as shown in FIG. 4 to start extruding film 27 from film cartridge 33 by means of the above-described gear train.

[Step 203] Immediately after sending the winding start signal to film feed control circuit 66, the operation of counting the time is started.

In step 202, film driving motor 1 is driven by film feed control circuit 66 to start rotating and feed spool 33$b$ and bar code disk 33$a$ in film cartridge 33 are thereby rotated. With this rotation, film 27 is extruded out of film cartridge 33. At this time, however, the film end collides against guide portions 25$d$ and 25$c$ of pressure plate 25, and the rotational speed of the feed spool 33$b$ and bar code disk 33$a$ is abruptly changed by the impact of each collision or by an abrupt change in load caused when the film end downwardly moves guide portion 25$d$ or 25$c$ against the urging force of spring 29 or 28. The length of time required to pass the film end (or leader portion) over guide portion 25$c$ after the time when the winding start signal is output is set as "Tb".

[Step 204] Determination is made as to whether the timer has counted to a predetermined time T2 (T2≧Tb). If NO, the process returns to step 202. If the predetermined time T2 is reached, the process proceeds to step 205.

Counting the count value "T2" by the timer corresponds to the completion of passage of the film end over guide portions 25$d$ and 25$c$. After passage through these positions, guide members 25$d$ and 25$c$ stably contact the lower end surface of film 27, so that load fluctuations are thereafter reduced and the film feed speed and the rotational speed of the bar code disk 33$a$ are stabilized, whereby information written on bar code disk 33$a$ is stably read with photoreflector 49.

[Step 205] The counting operation of the timer is stopped.

[Step 206] Since at this time bar code disk 33$a$ is rotating at the stabilized speed, photoreflector control circuit 67 is operated to read, with photoreflector 49, information on the film written on bar code disk 33$a$.

[Step 207] The amount of film feeding is calculated by a well-known means, e.g., counting unillustrated perforation holes formed in film 27 with an unillustrated photointerrupter to determine whether or not the first frame has reached the position corresponding to the aperture. Film feeding is continued until the first frame reaches this position. If it is determined that the first frame has reached the position at the aperture, the process proceeds to step 208.

[Step 208] Driving of film driving motor 1 is stopped through film feed control circuit 66 to stop winding the film.

Figure 15:
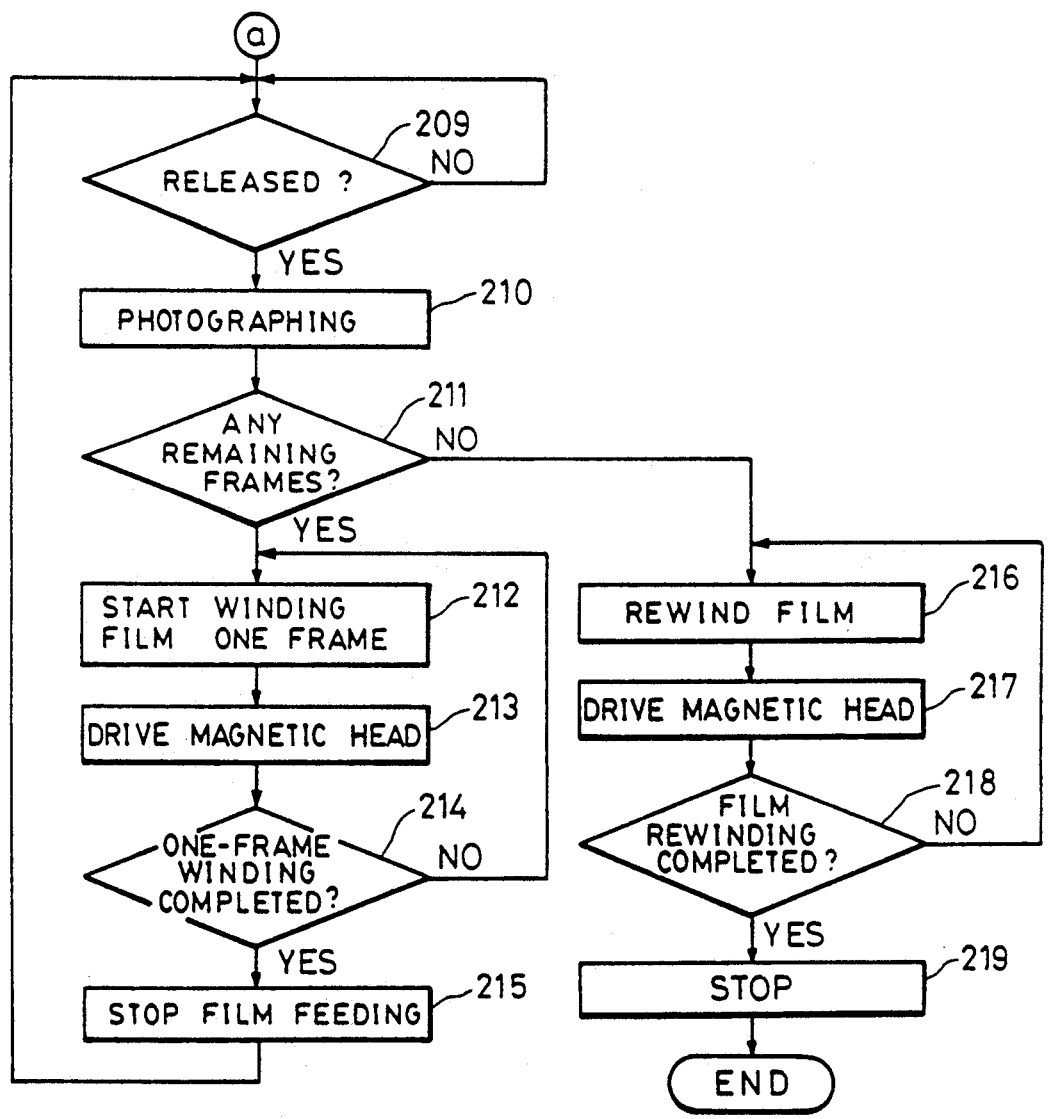
FIG. 15 is a flow chart continued from FIG. 14.

When the above operations are finished, the process proceeds to step 209 shown in FIG. 15.

[Step 209] Determination is made as to whether or not the unillustrated release button has been depressed so that switch 69 is turned on. If it is determined that switch 69 has been turned on, the process proceeds to step 210.

[Step 210] AF/AE control circuit 64 is operated to measure the luminance of the subject and to calculate information on the distance to the subject (distance metering information), and photographing operations including the operation of focusing the unillustrated lens and the exposure operation based on shutter control are performed based on the information obtained by AF/AE control circuit 64.

[Step 211] The number of release operations, the amount of film feeding or the like are compared with the specified number of film frames read out in step 206 to determine whether there are any remaining frames. If there is no remaining frame, the process proceeds to step 216. If there are some remaining frames, the process proceeds to step 212.

[Step 212] Film feed control circuit 66 is operated to start winding to set the next frame.

[Step 213] During the operation of winding film 27 for the next frame, magnetic head 26 is driven through magnetic head driving circuit 65 to write photography information obtained in step 210 on the magnetic recording portion of film 27.

[Step 214] Determination is made as to whether or not film 27 has been wound by one frame by, for example, counting perforation holes in film 27 with an unillustrated photointerrupter or counting the number of revolutions of a roller pressed on film 27, as mentioned above. If it is determined that film 27 has been wound by one frame, the process proceeds to step 215.

[Step 215] Driving of film driving motor 1 is stopped through film feed control circuit 66 to stop winding film 27, and the process returns to step 209.

[Step 216] Since there are no remaining frames of film 27, film driving motor 1 is driven in the film rewinding direction through film feed control circuit 66 to start rewinding film 27 (winding into film cartridge 33).

[Step 217] During the operation of rewinding film 27 into film cartridge 33, magnetic head 26 is driven through magnetic head driving circuit 65 to write photography information obtained in step 210 on the magnetic recording portion of the final photographed frame of film 27.

[Step 218] Determination is made as to whether or not film 27 has been completely rewound into film cartridge 33 by using well-known means, e.g., detecting input of a signal supplied from an unillustrated input means by user's judgment or an elapse of time for film rewinding, or detecting the position of film 27 with a photocoupler as mentioned above. If the completion of rewinding is detected, the process proceeds to step 219. If the completion of rewinding is not detected, the process returns to step 216.

[Step 219] Driving of film driving motor 1 is stopped through film feed control circuit 66, and the overall camera operation is thereafter stopped.

Figure 16:
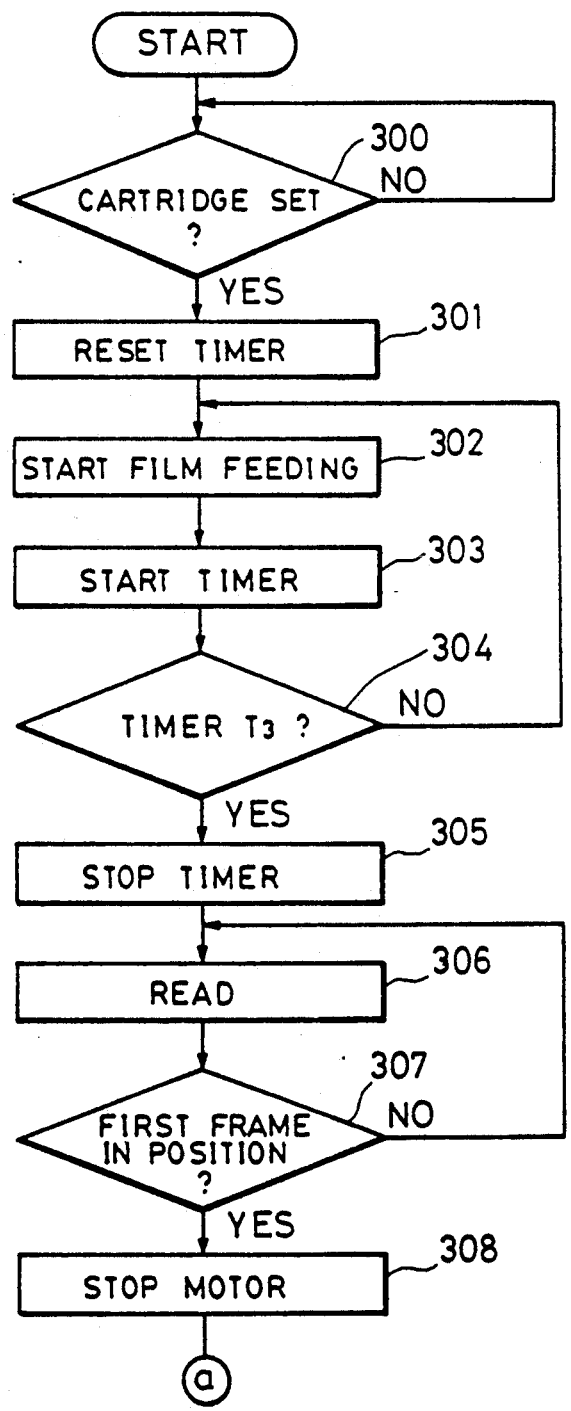
FIG. 16 is a flow chart of a part of still another example of the operation of the control circuit shown in FIG. 1.

Still another example of the operation of control circuit 63 will be described below with reference to FIGS. 16 and 17.

[Step 300] Film cartridge 33 is set in cartridge chamber 22, and cartridge cover 51 is closed. Both cartridge cover opening/closing switch 53 and cartridge detection switch 68 are thereby turned on, and control circuit 63 determines that film cartridge 33 has been set in the camera from these switch operations. The process then proceeds to step 301.

[Step 301] An internal timer is reset.

[Step 302] Since film cartridge 33 has been set, a winding start signal is sent to film feed control circuit 66 in this step. Film driving motor 1 is thereby rotated in the direction B as shown in FIG. 4 to start extruding film 27 from film cartridge 33 by means of the above-described gear train.

[Step 303] Immediately after sending the winding start signal to film feed control circuit 66, the operation of counting the time is started.

In step 302, film driving motor 1 is driven by film feed control circuit 66 to start rotating and feed spool 33b and bar code disk 33a in film cartridge 33 are thereby rotated. With this rotation, film 27 is extruded out of film cartridge 33. At this time, however, the film end enters the gap between magnetic head 26 and pressing lever 31, and the rotational speed of the feed spool 33b and bar code disk 33a is abruptly changed by an impact caused when the film end enters the gap or by an abrupt change in load caused when the film end forces pressing lever 31 against the urging force of spring 32. The length of time required to pass the film end over the position of magnetic head 26 after the time when the winding start signal is output is set as "Tc".

[Step 304] Determination is made as to whether the timer has counted to a predetermined time T3 (T3≧Tc). If NO, the process returns to step 302. If the predetermined time T3 is reached, the process proceeds to step 305.

Counting the count value "T3" by the timer corresponds to the completion of passage of the film end over the position of magnetic head 26. After passage over this position, the pressing lever 31 stably presses film 27 on magnetic head 26 by a constant force, so that load fluctuations are thereafter reduced and the film feed speed and the rotational speed of the bar code disk 33a are stabilized, whereby information written on bar code disk 33a is stably read with photoreflector 49.

[Step 305] The counting operation of the timer is stopped.

[Step 306] Since at this time bar code disk 33a is rotating at the stabilized speed, photoreflector control circuit 67 is operated to read, with photoreflector 49, information on the film written on bar code disk 33a.

[Step 307] The amount of film feeding is calculated by a well-known means, e.g., counting unillustrated perforation holes formed in film 27 with an unillustrated photointerrupter to determine whether or not the first frame has reached the position corresponding to the aperture. Film feeding is continued until the first frame reaches this position. If it is determined that the first frame has reached the position at the aperture, the process proceeds to step 308.

[Step 308] Driving of film driving motor 1 is stopped through film feed control circuit 66 to stop winding the film.

Figure 17:
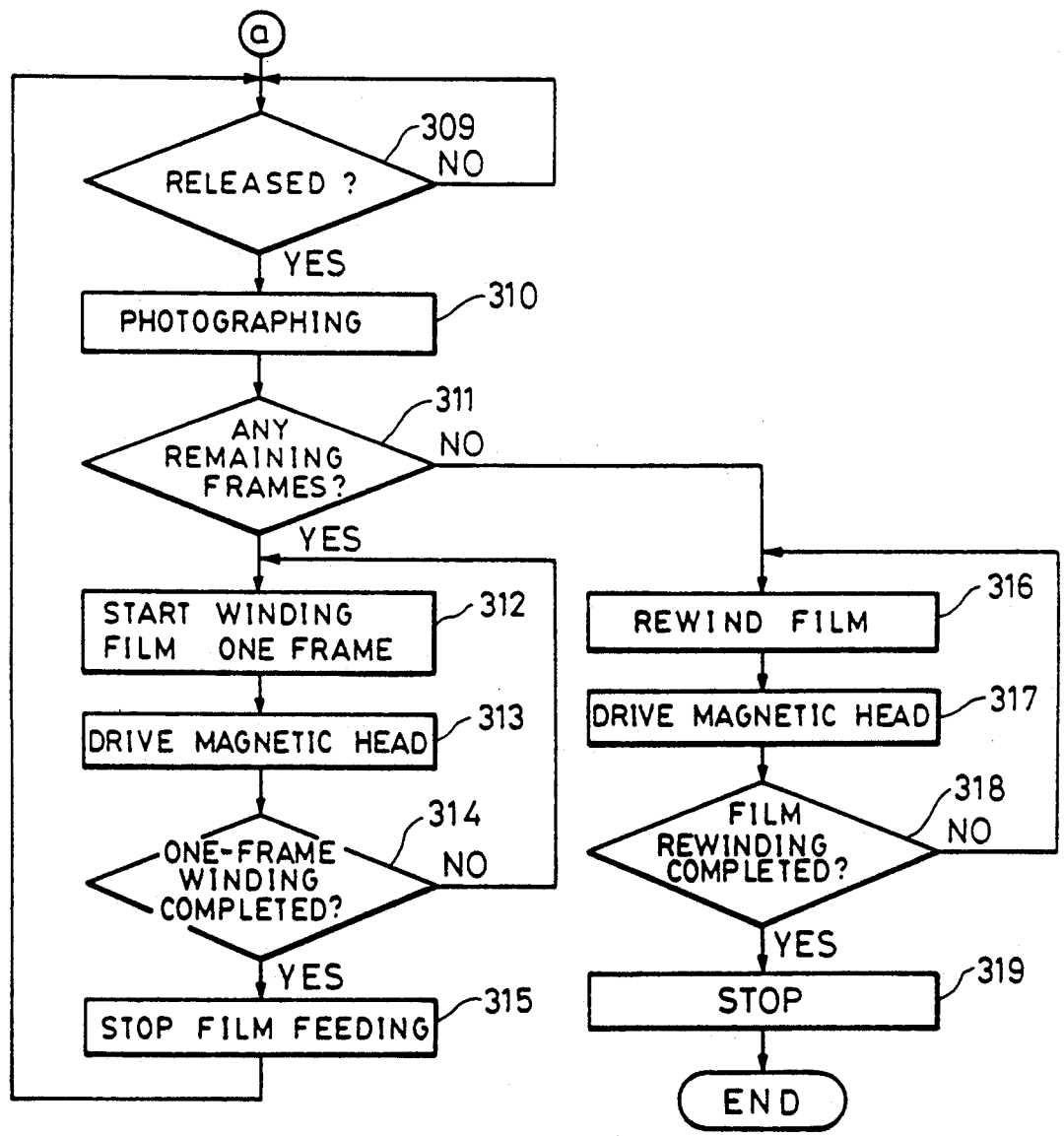
FIG. 17 is a flow chart continued from FIG. 17.

When the above operations are finished, the process proceeds to step 309 shown in FIG. 17.

[Step 309] Determination is made as to whether or not the unillustrated release button has been depressed so that switch 69 is turned on. If it is determined that switch 69 has been turned on, the process proceeds to step 310.

[Step 310] AF/AE control circuit 64 is operated to measure the luminance of the subject and to calculate information on the distance to the subject (distance metering information), and photographing operations including the operation of focusing the unillustrated lens and the exposure operation based on shutter control are performed based on the information obtained by AF/AE control circuit 64.

[Step 311] The number of release operations, the amount of film feeding or the like are compared with the specified number of film frames read out in step 306 to determine whether there are any remaining frames. If there is no remaining frame, the process proceeds to step 316. If there are some remaining frames, the process proceeds to step 312.

[Step 312] Film feed control circuit 66 is operated to start winding to set the next frame.

[Step 313] During the operation of winding film 27 for the next frame, magnetic head 26 is driven through magnetic head driving circuit 65 to write photography information obtained in step 310 on the magnetic recording portion of film 27.

[Step 314] Determination is made as to whether or not film 27 has been wound by one frame by, for example, counting perforation holes in film 27 with the unillustrated photointerrupter or counting the number of revolutions of a roller pressed on film 27, as mentioned above. If it is determined that film 27 has been wound by one frame, the process proceeds to step 315.

[Step 315] Driving of film driving motor 1 is stopped through film feed control circuit 66 to stop winding film 27, and the process returns to step 309.

[Step 316] Since there are no remaining frames of film 27, film driving motor 1 is driven in the film rewinding direction through film feed control circuit 66 to start rewinding film 27 (winding into film cartridge 33).

[Step 317] During the operation of rewinding film 27 into film cartridge 33, magnetic head 26 is driven through magnetic head driving circuit 65 to write photography information obtained in step 310 on the magnetic recording portion of the final photographed frame of film 27.

[Step 318] Determination is made as to whether or not film 27 has been completely rewound into film cartridge 33 by using well-known means, e.g., detecting input of a signal supplied from an unillustrated input means by user's judgment, an elapse of time for film rewinding, or detecting the position of film 27 with a photocoupler as mentioned above. If the completion of rewinding is detected, the process proceeds to step 319. If the completion of rewinding is not detected, the process returns to step 316.

[Step 319] Driving of film driving motor 1 is stopped through film feed control circuit 66, and the overall camera operation is thereafter stopped.

Figure 18:
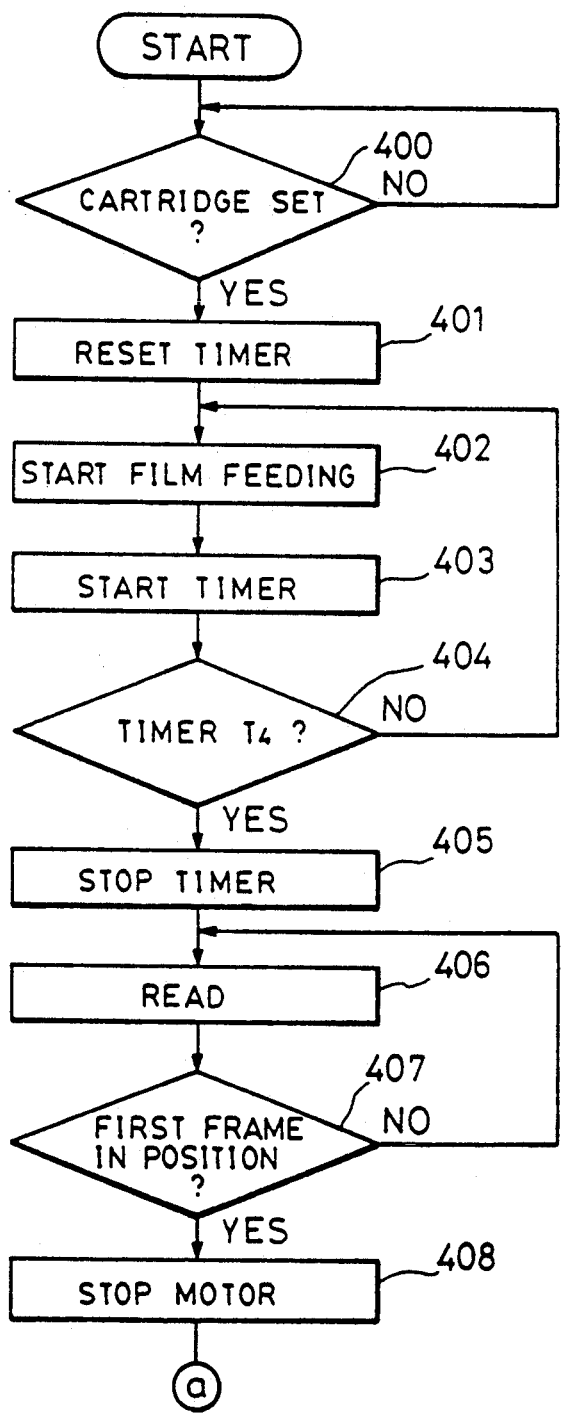
FIG. 18 is a flow chart of a part of a further example of the operation of the control circuit shown in FIG. 1.

Still a further example of the operation of control circuit 63 will be described below with reference to FIGS. 18 and 19.

[Step 400] Film cartridge 33 is set in cartridge chamber 22, and cartridge cover 51 is closed. Both cartridge cover opening/closing switch 53 and cartridge detection switch 68 are thereby turned on, and control circuit 63 determines that film cartridge 33 has been set in the camera from these switch operations. The process then proceeds to step 401.

[Step 401] An internal timer is reset.

[Step 402] Since film cartridge 33 has been set, a winding start signal is sent to film feed control circuit 66 in this step. Film driving motor 1 is thereby rotated in the direction B as shown in FIG. 4 to start extruding film 27 from film cartridge 33 by means of the above-described gear train.

[Step 403] Immediately after sending the winding start signal to film feed control circuit 66, the operation of counting the time is started.

In step 402, film driving motor 1 is driven by film feed control circuit 66 to start rotating and feed spool 33b and bar code disk 33a in film cartridge 33 are thereby rotated. With this rotation, film 27 is extruded out of film cartridge 33. At this time, however, the film end collides against roller plate 61 (FIG. 2) when wrapped around film take-up spool 7 of the camera after being passed over pressure plate 25 and enters the gap between magnetic head 26 and pressing lever 31, and the rotational speed of the feed spool 33b and bar code disk 33a is abruptly changed by the impact of the collision or a shock due to the abovementioned relationship (V1>V2) between the film extrusion speed V2 and the peripheral speed V1 of film take-up spool 7. The length of time required to wrap the film end around film take-up spool 7 after the time when the winding start signal is output is set as "Td".

[Step 404] Determination is made as to whether the timer has counted to a predetermined time T4 (T4≧Td). If NO, the process returns to step 402. If the predetermined time T4 is reached, the process proceeds to step 405.

Counting the count value "T4" by the timer corresponds to the completion of wrapping of the film end around the film take-up spool 7. After the completion of wrapping, film 27 is stably fed by film take-up spool 7 alone, so that load fluctuations are thereafter reduced and the film feed speed and the rotational speed of the bar code disk 33a are stabilized, whereby information written on bar code disk 33a is stably read with photoreflector 49.

[Step 405] The counting operation of the timer is stopped.

[Step 406] Since at this time bar code disk 33a is rotating at the stabilized speed, photoreflector control circuit 67 is operated to read, with photoreflector 49, information on the film written on bar code disk 33a.

[Step 407] The amount of film feeding is calculated by a well-known means, e.g., counting unillustrated perforation holes formed in film 27 with an unillustrated photointerrupter to determine whether or not the first frame has reached the position corresponding to the aperture. Film feeding is continued until the first frame reaches this position. If it is determined that the first frame has reached the position at the aperture, the process proceeds to step 408.

[Step 408] Driving of film driving motor 1 is stopped through film feed control circuit 66 to stop winding the film.

Figure 19:
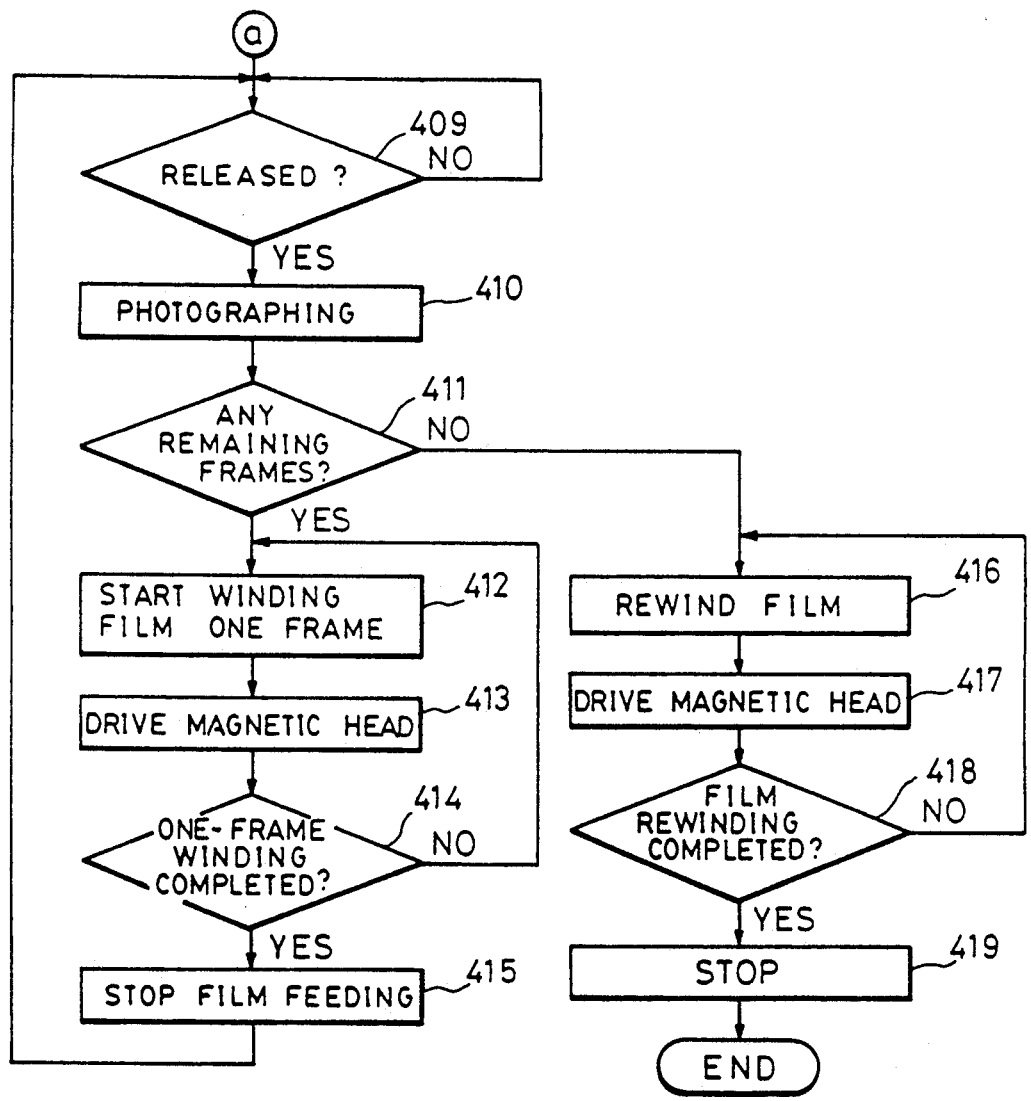
FIG. 19 is a flow chart continued from FIG. 18.

When the above operations are finished, the process proceeds to step 409 shown in FIG. 19.

[Step 409] Determination is made as to whether or not the unillustrated release button has been depressed so that switch 69 is turned on. If it is determined that switch 69 has been turned on, the process proceeds to step 410.

[Step 410] AF/AE control circuit 64 is operated to measure the luminance of the subject and to calculate information on the distance to the subject (distance metering information), and photographing operations including the operation of focusing the unillustrated lens and the exposure operation based on shutter control are performed based on the information obtained by AF/AE control circuit 64.

[Step 411] The number of release operations, the amount of film feeding or the like are compared with the specified number of film frames read out in step 406 to determine whether there are any remaining frames. If there is no remaining frame, the process proceeds to step 416. If there are some remaining frames, the process proceeds to step 412.

[Step 412] Film feed control circuit 66 is operated to start winding to set the next frame.

[Step 413] During the operation of winding film 27 for the next frame, magnetic head 26 is driven through magnetic head driving circuit 65 to write photography information obtained in step 410 on the magnetic recording portion of film 27.

[Step 414] Determination is made as to whether or not film 27 has been wound by one frame by, for example, counting perforation holes in film 27 with the unillustrated photointerrupter or counting the number of revolutions of a roller pressed on film 27, as mentioned above. If it is determined that film 27 has been wound by one frame, the process proceeds to step 415.

[Step 415] Driving of film driving motor 1 is stopped through film feed control circuit 66 to stop winding film 27, and the process returns to step 409.

[Step 416] Since there are no remaining frames of film 27, film driving motor 1 is driven in the film rewinding direction through film feed control circuit 66 to start rewinding film 27 (winding into film cartridge 33).

[Step 417] During the operation of rewinding film 27 into film cartridge 33, magnetic head 26 is driven through magnetic head driving circuit 65 to write photography information obtained in step 410 on the magnetic recording portion of the final photographed frame of film 27.

[Step 418] Determination is made as to whether or not film 27 has been completely rewound into film cartridge 33 by using well-known means, e.g., detecting input of a signal supplied from an unillustrated input means by user's judgment or an elapse of time for film rewinding, or detecting the position of film 27 with the photocoupler as mentioned above. If the completion of rewinding is detected, the process proceeds to step 419. If the completion of rewinding is not detected, the process returns to step 416.

[Step 419] Driving of film driving motor 1 is stopped through film feed control circuit 66, and the overall camera operation is thereafter stopped.

In the above-described processes, when film information written on the bar code disk rotated integrally with the feed spool in the film cartridge is read from the bar code disk during rotation of the disk, the information is read out at predetermined times Ta, Tb, Tc or Td after the start of the bar code disk rotation, that is, read out when the rotation of the bar code disk is stabilized, whereby occurrence of a read error is prevented.

Figure 20:
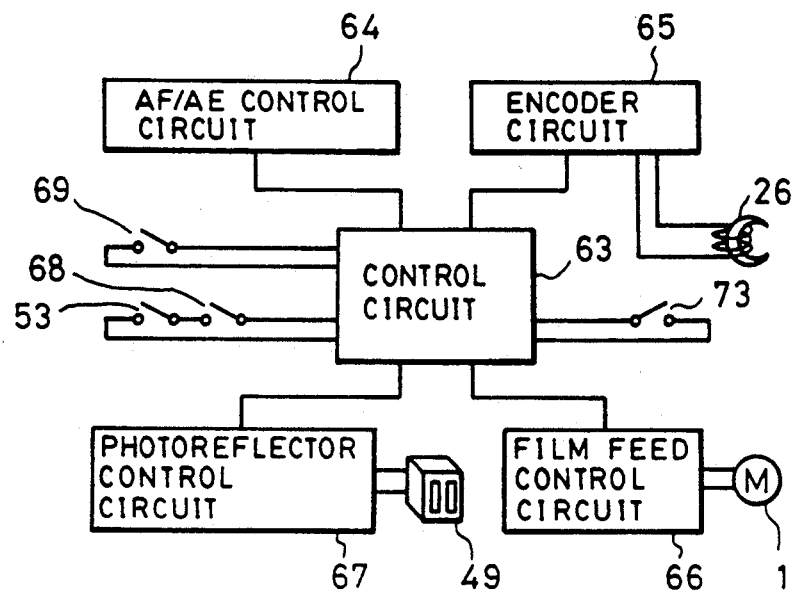
FIG. 20 is a diagram of electrical blocks of a camera in accordance with a second embodiment of the present invention.
Figure 21:
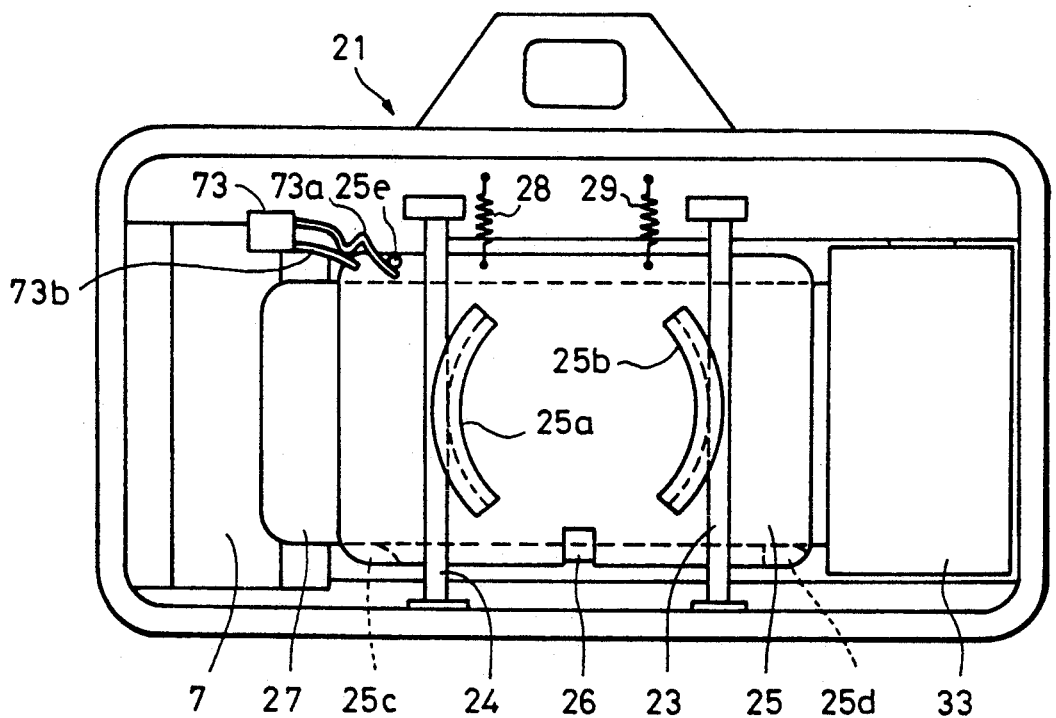
FIG. 21 is a diagram of a film feeding state of the mechanism of the camera shown in FIG. 20, in which the camera back is omitted.
Figure 22:
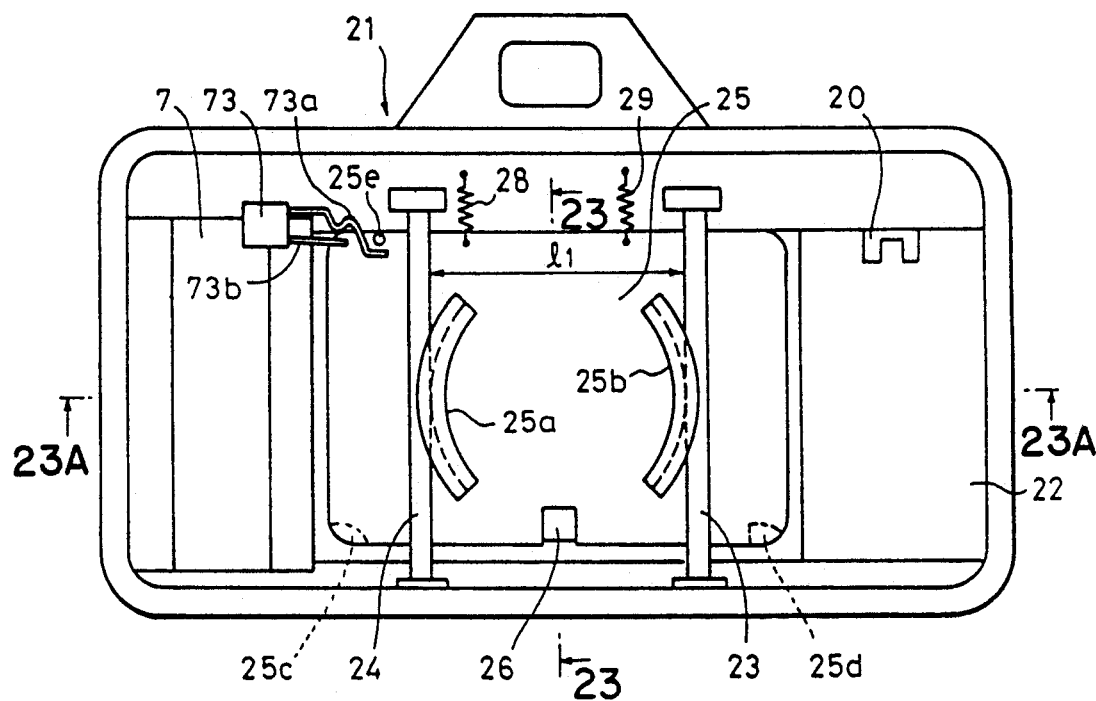
FIG. 22 is a rear elevation of the camera shown in FIG. 20, in which the camera back is omitted.
Figure 23:
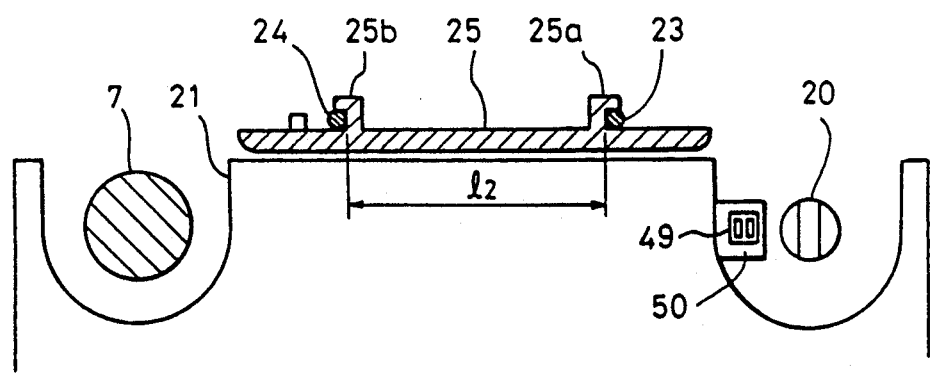
FIG. 23 is a cross-sectional view taken along the line A—A of FIG. 22.

FIGS. 20 to 23 show the second embodiment of the present invention; FIG. 20 is a diagram of electrical blocks of a camera in accordance with this embodiment; and FIGS. 21 to 24 are diagrams showing the mechanical construction of the camera shown in FIG. 20. FIG. 21 is a diagram of the mechanism at the time of film feeding, in which the camera back is not shown; FIG. 22 is a rear elevation of the camera, in which the camera back is not shown; and FIG. 23 is a cross-sectional view taken along the line A—A of FIG. 22.

Components of this embodiment identical or corresponding to those of the first embodiment are indicated by the same reference characters and the description for them will not be repeated.

A pressure contact detection switch 73 is fixed to camera body 21. In the state shown in FIG. 20, contact pieces 73a and 73b of switch 73 do not contact electrically with each other. A dowel 25e provided on pressure plate 25 and contact piece 73 can contact each other. When dowel 25e is moved downward, it deforms contact piece 73a so that electrical connection is established between contact pieces 73a and 73b.

When cartridge cover 51 is closed after operating cartridge opening/closing lever 54 (see FIG. 10), opening cartridge cover 51 and setting film cartridge 33 in cartridge chamber 22, fork gear 19 is driven by film driving motor 1 so that fork 20 starts rotating in the normal direction, as described above. The feed spool 33b of film cartridge 33 engaged with fork 20 then starts rotating in the same direction. Film 27 is thereby moved forward out of film cartridge 33, and the film end enters the gap between pressure plate 25 and camera body 21. As film 27 further moves toward the spool chamber (to the left as viewed in FIG. 21), the film end is brought into contact with film guide member 25d, moves this guide member downward against the urging force of spring 29, and passes this position. Film 27 and pressure plate 25 are thereby positioned relatively on the right-hand side with spring 29 and guide member 25d. As film 27 further moves, the film end is brought into contact with guide member 25c, moves this guide member downward against the urging force of spring 28, and passes this position. At this time, dowel 25e of pressure plate 25 is brought into contact with contact piece 73a to establish electrical connection between contacts 73a and 73b, and film 27 and pressure plate 25 are positioned relatively on the left-hand side with spring 28 and guide member 25c. During this process of positioning, film 27 passes the position of magnetic head 26, and the tip of magnetic head 26 slides on the magnetic recording portion (not shown) of film 27 to enable writing or reading of photography information. The film end is wrapped around film take-up spool 7 at the end of this film feeding. Thereafter, film 27 is wound up only by the rotation of film take-up spool 7 rotated by film driving motor 1 as described later.

The operation of control circuit 63 of FIG. 20 will be described below with reference to the flow charts of FIGS. 24 and 25.

[Step 500] Film cartridge 33 is set in cartridge chamber 22, and cartridge cover 51 is closed. Both cartridge cover opening/closing switch 53 and cartridge detection switch 68 are thereby turned on, and control circuit 63 determines that film cartridge 33 has been set in the camera from these switch operations. The process then proceeds to step 501.

[Step 501] Since film cartridge 33 has been set, a winding start signal is sent to film feed control circuit 66 in this step. Film driving motor 1 is thereby rotated to start extruding film 27 from film cartridge 33 in the above-described manner.

[Step 502] When the film end is brought into contact with guide members 25d and then with 25c as film 27 is transported, the film feed speed and the rotational speed of bar code disk 33a are changed for an instant as described above. In this step, determination is made as to whether or not pressure contact detection switch 73 for detecting the completion of stabilizing the film feed speed and the rotational speed of bar code disk 33a has been turned on. If it is on, the process proceeds to step 503. If pressure detection switch 73 is off, film feeding is continued.

[Step 503] Since at this time bar code disk 33a is rotating at the stabilized speed, photoreflector control circuit 67 is operated to read, with photoreflector 49, information on the film written on bar code disk 33a, e.g., the specified number of film frames, the film speed and the kind of film.

The film feed speed is changed more abruptly by the impact of the collision of the film end against guide member 25d or 25c than by the change in load when the film end moves guide member 25d or 25c downward against the urging force of spring 29 or 28. However, when pressure contact detection switch 73 is turned on in step 502, guide members 25c and 25d are stably pressed against the lower end surface of film 27. After this switch operation, therefore, load fluctuations are small and the variations in the film feed speed and the rotational speed of bar code disk 33a are also small. It is therefore possible to stably read out information written on bar code disk 33a with photoreflector 49. Magnetic head driving circuit 65 may be operated simultaneously to read out information written on the magnetic recording portion of the film with magnetic head 26.

[Step 504] The amount of film feeding is calculated by a well-known means, e.g., counting unillustrated perforation holes formed in film 27 with an unillustrated photointerrupter, counting the number of revolutions of an unillustrated roller pressed on film 27 with a pulse plate or the like, or calculation from the time for driving of film driving motor 1 to determine whether or not the first frame has reached the position corresponding to the aperture. Film feeding is continued until the first frame reaches this position. If it is determined that the first frame has reached the position at the aperture, the process proceeds to step 505.

[Step 505] Driving of film driving motor 1 is stopped through film feed control circuit 66 to stop winding the film.

Figure 25:
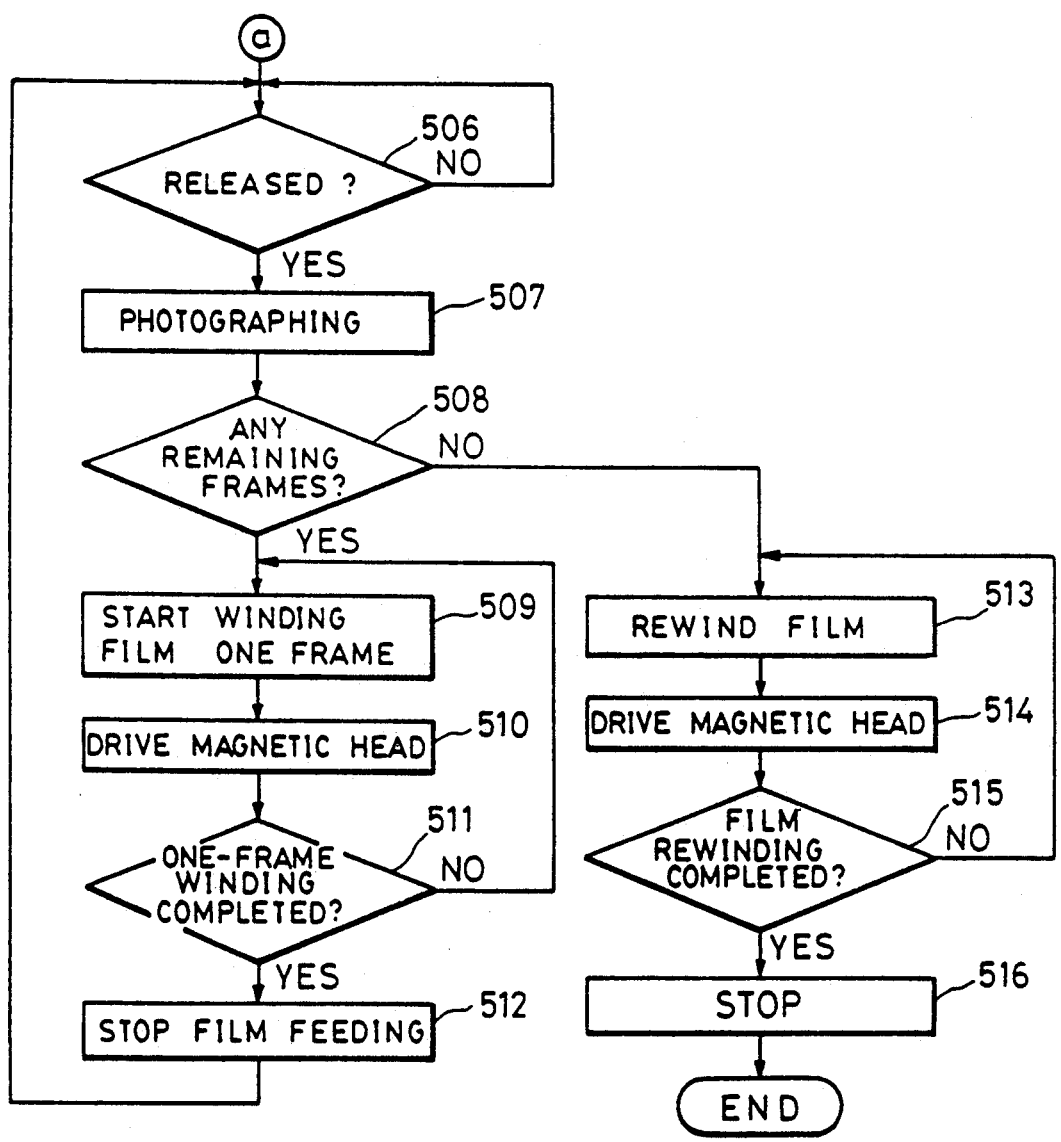
FIG. 25 is a flow chart continued from FIG. 24.

When the above operations are finished, the process proceeds to step 506 shown in FIG. 25.

[Step 506] Determination is made as to whether or not the unillustrated release button has been depressed so that switch 69 is turned on. If it is determined that switch 69 has been turned on, the process proceeds to step 507.

[Step 507] AF/AE control circuit 64 is operated to measure the luminance of the subject and to calculate information on the distance to the subject (distance metering information), and photographing operations including the operation of focusing the unillustrated lens and the exposure operation based on shutter control are performed based on the information obtained by AF/AE control circuit 64.

[Step 508] The number of release operations, the amount of film feeding or the like are compared with the specified number of film frames read out in step 503 to determine whether there are any remaining frames. If there is no remaining frame, the process proceeds to step 513. If there are some remaining frames, the process proceeds to step 509.

[Step 509] Film feed control circuit 66 is operated to start winding to set the next frame.

[Step 510] During the operation of winding film 27 for the next frame, magnetic head 26 is driven through magnetic head driving circuit 65 to write photography information (shutter speed, aperture value, date, etc.) obtained in step 507 on the magnetic recording portion of film 27.

[Step 511] Determination is made as to whether or not film 27 has been wound by one frame by, for example, counting perforation holes in film 27 with an unillustrated photointerrupter or counting the number of revolutions of a roller pressed on film 27, as mentioned above. If it is determined that film 27 has been wound by one frame, the process proceeds to step 516.

[Step 512] Driving of film driving motor 1 is stopped through film feed control circuit 66 to stop winding film 27, and the process returns to step 506.

[Step 513] Since there is no remaining frame of film 27, film driving motor 1 is driven in the film rewinding direction) through film feed control circuit 66 to start rewinding film 27 (winding into film cartridge 33).

[Step 514] During the operation of rewinding film 27 into film cartridge 33, magnetic head 26 is driven through magnetic head driving circuit 65 to write photography information (shutter speed, aperture value, date, etc.) obtained in step 507 on the magnetic recording portion of the final photographed frame of film 27.

[Step 515] If it is determined that film 27 has been completely rewound into film cartridge 33 when a predetermined time elapses after pressure contact detection switch 73 has been turned off at the time of passage of the film end over guide member 25c while film 27 is rewound into film cartridge 33, the process proceeds to step 516.

[Step 516] Driving of film driving motor 1 is stopped through film feed control circuit 66, and the overall camera operation is thereafter stopped.

Figure 26:
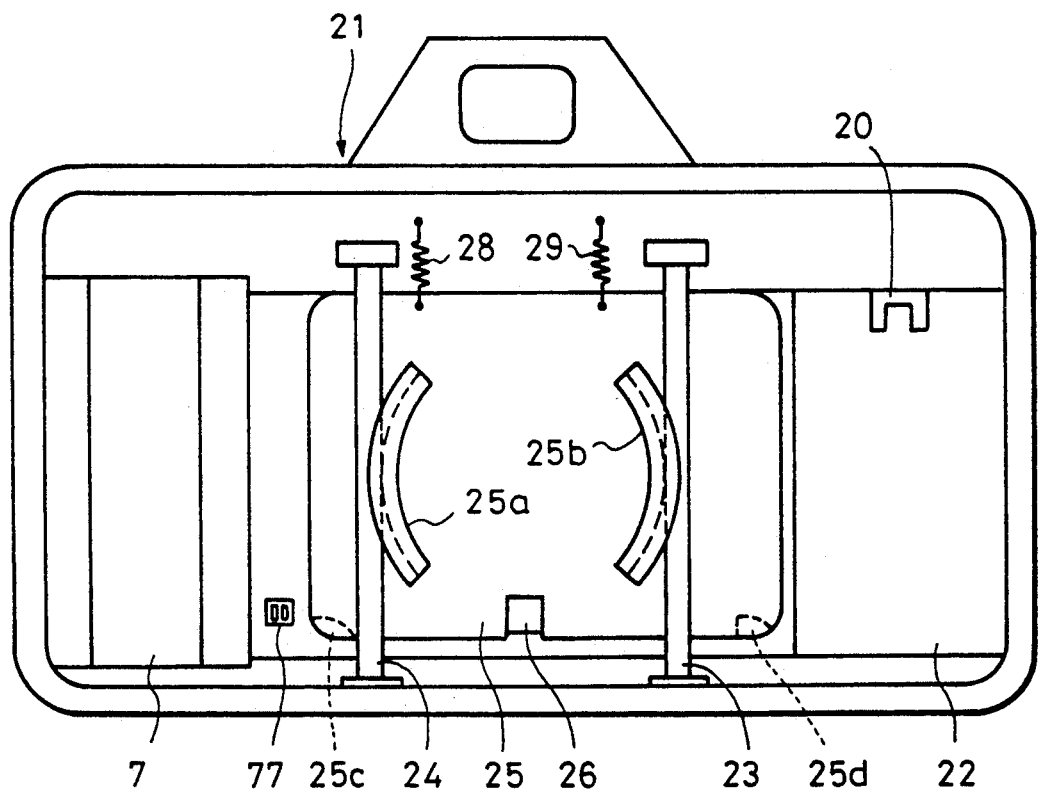
FIG. 26 is a rear elevation of a camera in accordance with a third embodiment of the present invention, in which the camera back is omitted.

FIGS. 26 is a rear elevation of a camera in accordance with the third embodiment of the present invention, in which the camera back is not shown. Components of this embodiment corresponding to those of the above-described embodiments are indicated by the same reference characters.

In the embodiment shown in FIG. 20, passage of the film end over guide member 25c is detected by using dowel 25e interlocked with the movement of guide member 25c. In contrast, in this embodiment, the position of the film end is detected instead of detecting pressed contact of the guide member with the film end surface. That is, a photointerrupter 77 is disposed on the film take-up spool 7 side relative to guide member 25c to detect the film end. After the film end has been detected with photointerrupter 77, information written on bar code disk 33a is read out.

Figure 27:
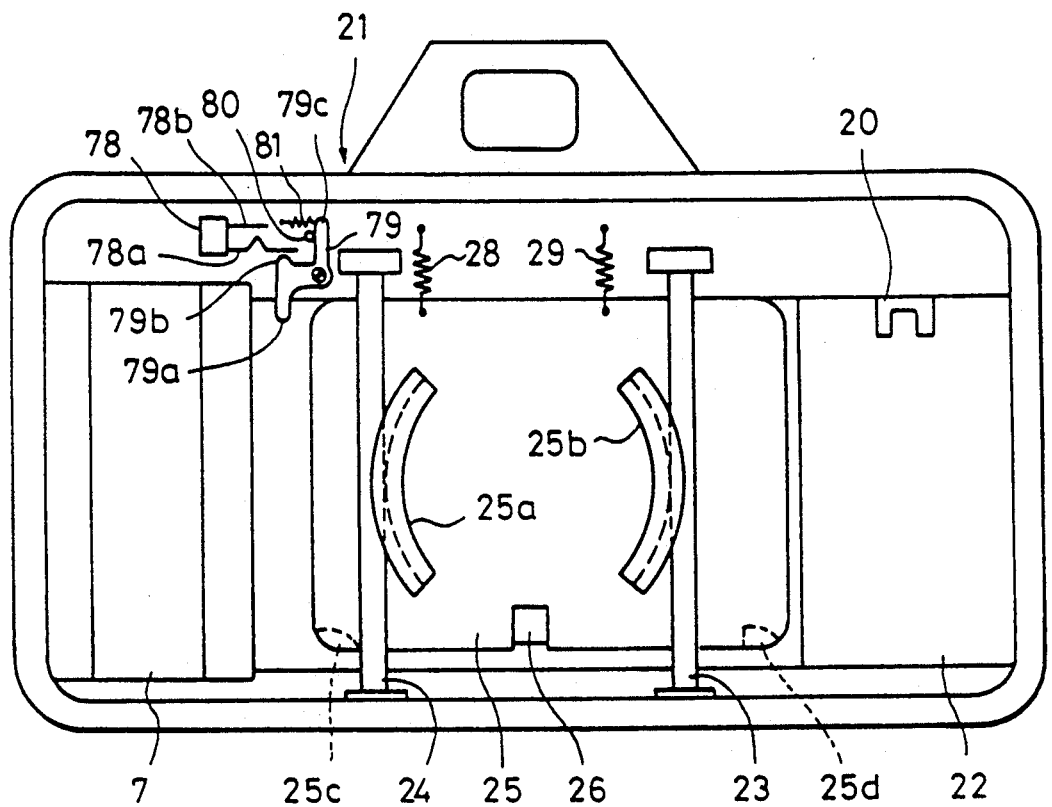
FIG. 27 is a rear elevation of a camera in accordance with a fourth embodiment of the present invention, in which the camera back is omitted.

FIGS. 27 is a rear elevation of a camera in accordance with the fourth embodiment of the present invention, in which the camera back is not shown. Components of this embodiment corresponding to those of the above-described embodiments are indicated by the same reference characters.

Figure 24:
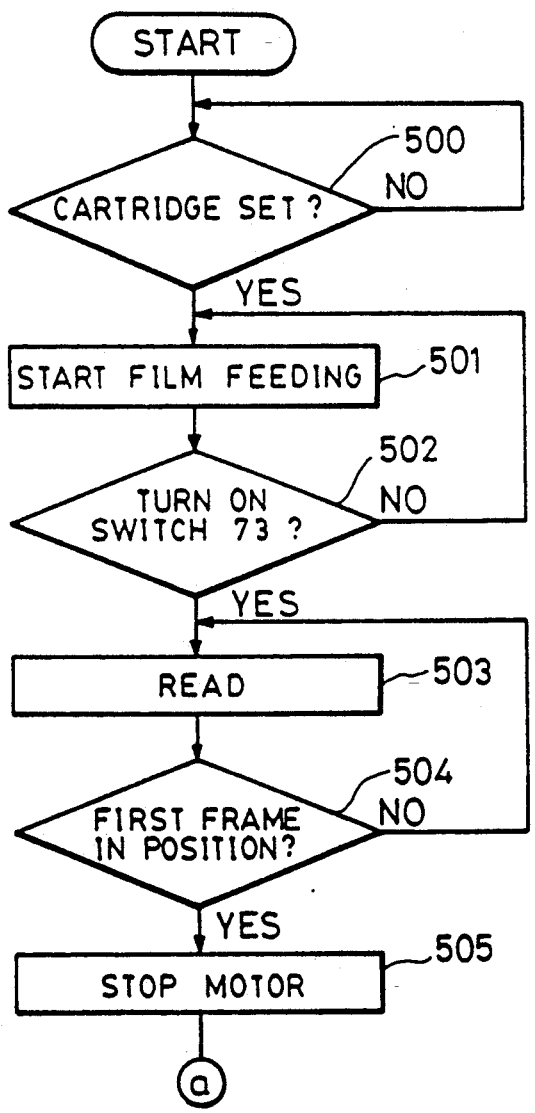
FIG. 24 is a flow chart of a part of the operation of the control circuit shown in FIG. 20.

In this embodiment, photointerrupter 77 as shown in FIG. 24 is replaced with a mechanical switch. A film detection lever 79 is rotatably attached to camera body 21. A portion 79a of film detection lever 79 can contact the leading end and an upper end surface of the film. Portion 79a is in contact with the upper end surface of the film when it is rotated clockwise from the state shown in FIG. 27. A contact piece 78a of a detection switch 78 is deformed by a portion 79b of film detection lever 79 to electrically contact a contact piece 78b, thereby detecting passage of the leading end of film 27 over guide member 25c. A stopper 80 for limiting the position of film detection lever 79 with respect to the counterclockwise rotation thereof is provided on camera body 21. A spring 81 applies an urging force to film detection lever 79 to rotate it in the counterclockwise direction and bring this lever into contact with stopper 80 or the upper end surface of the film.

Figure 28:
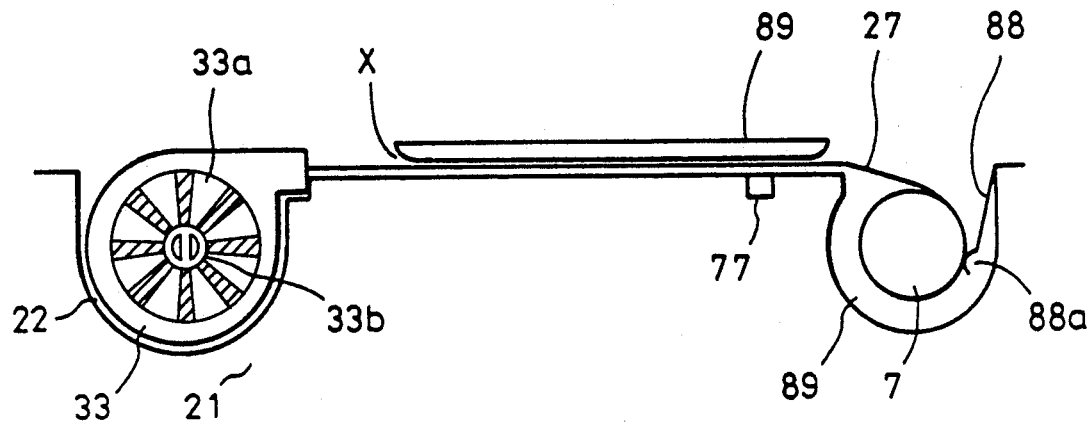
FIG. 28 is a plan view of a camera in accordance with a fifth embodiment of the present invention.

FIGS. 28 is a schematic plan view of the construction of a camera in accordance with the fifth embodiment of the present invention. Components of this embodiment corresponding to those of the above-described embodiments are indicated by the same reference characters.

The film feed load is abruptly changed by a frictional force caused when the film end enters the gap between a pressure plate 89 and camera body 21 and by an impact force caused by the collision of the film end against pressure plate at the time of automatic film loading, irrespective of whether or not magnetic recording on film 27 is effected. (The state of pressure plate 89, i.e., a state of being fixed to the camera body or a state of being movable relative to the camera body does not substantially influences this load change.) However, the load is constant after the film end has entered the gap between pressure plate 89 and camera body 21.

In this embodiment, therefore, photointerrupter 77 is disposed between spool chamber 89 and a point X corresponding to the end of the pressure plate on the cartridge chamber side to detect a position at which the film feed load is constant. After this detection, information is read from bar code disk 33a. It is thereby possible to reduce read errors.

Figure 29:
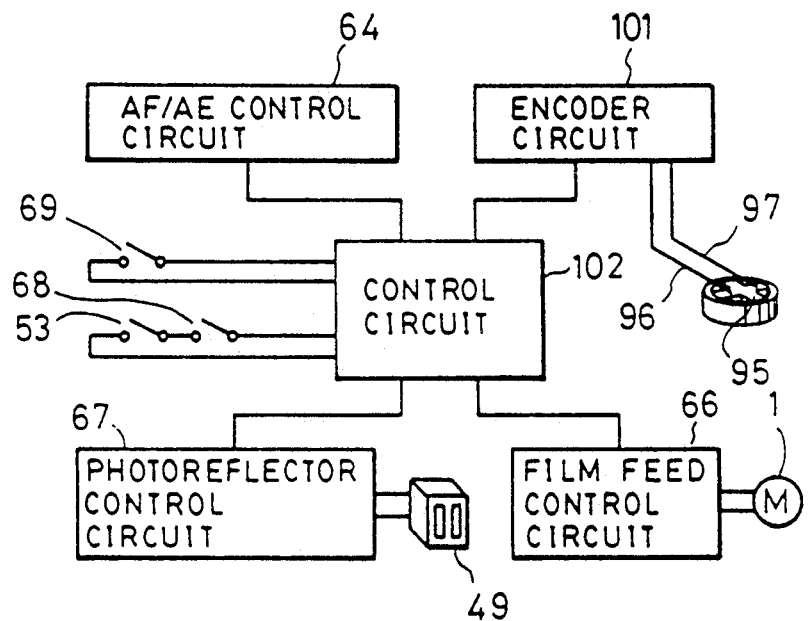
FIG. 29 is a diagram of electrical blocks of a camera in accordance with a sixth embodiment of the present invention.
Figure 30:
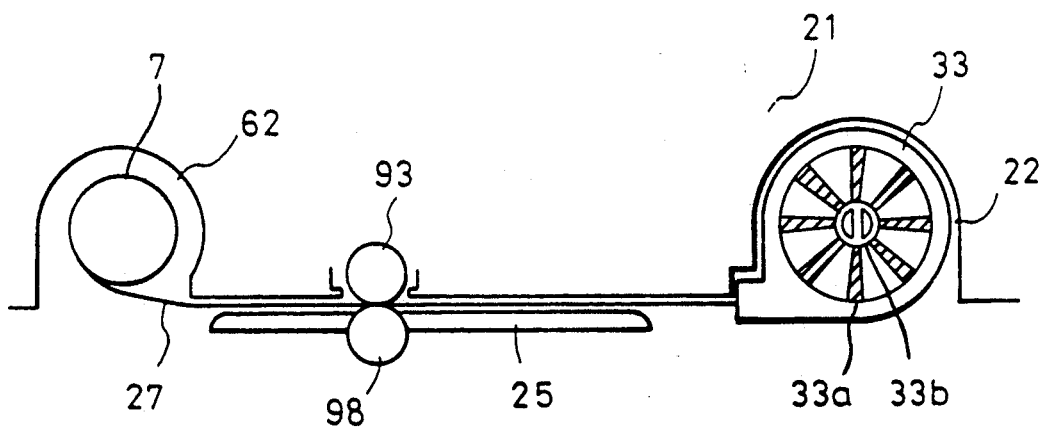
FIG. 30 is a diagram of the mechanism of an essential portion of the camera shown in FIG. 29.
Figure 31:
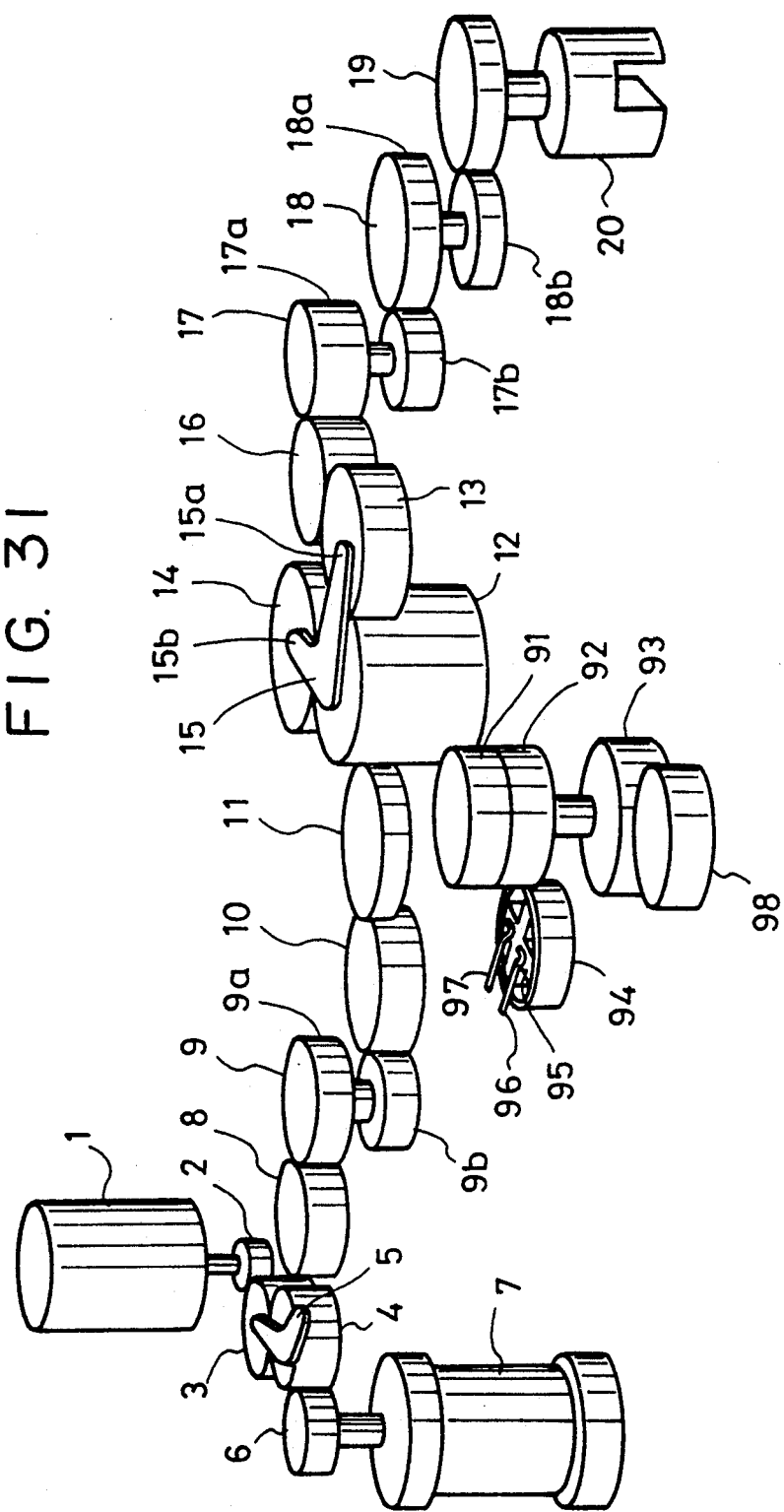
FIG. 31 is a perspective view of a film feed mechanism of the camera shown in FIG. 29.
Figure 32:
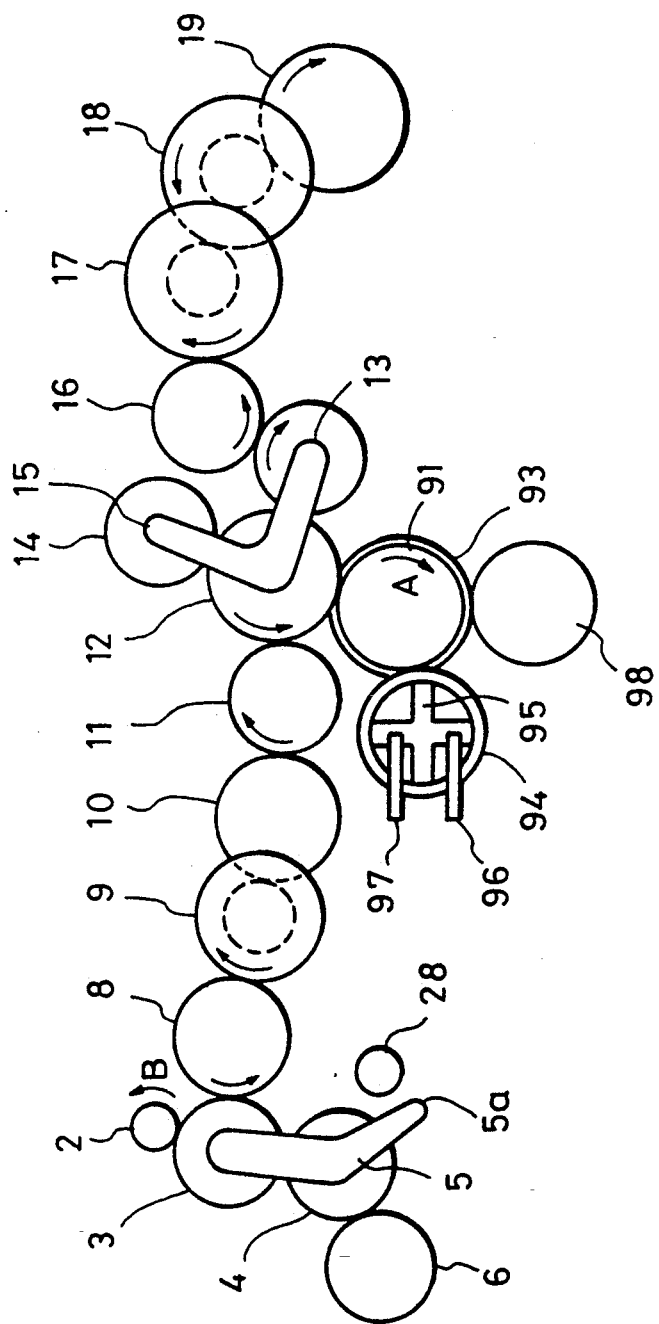
FIG. 32 is a plan view of a gear train at the time of film winding of the camera shown in FIG. 29.
Figure 33:
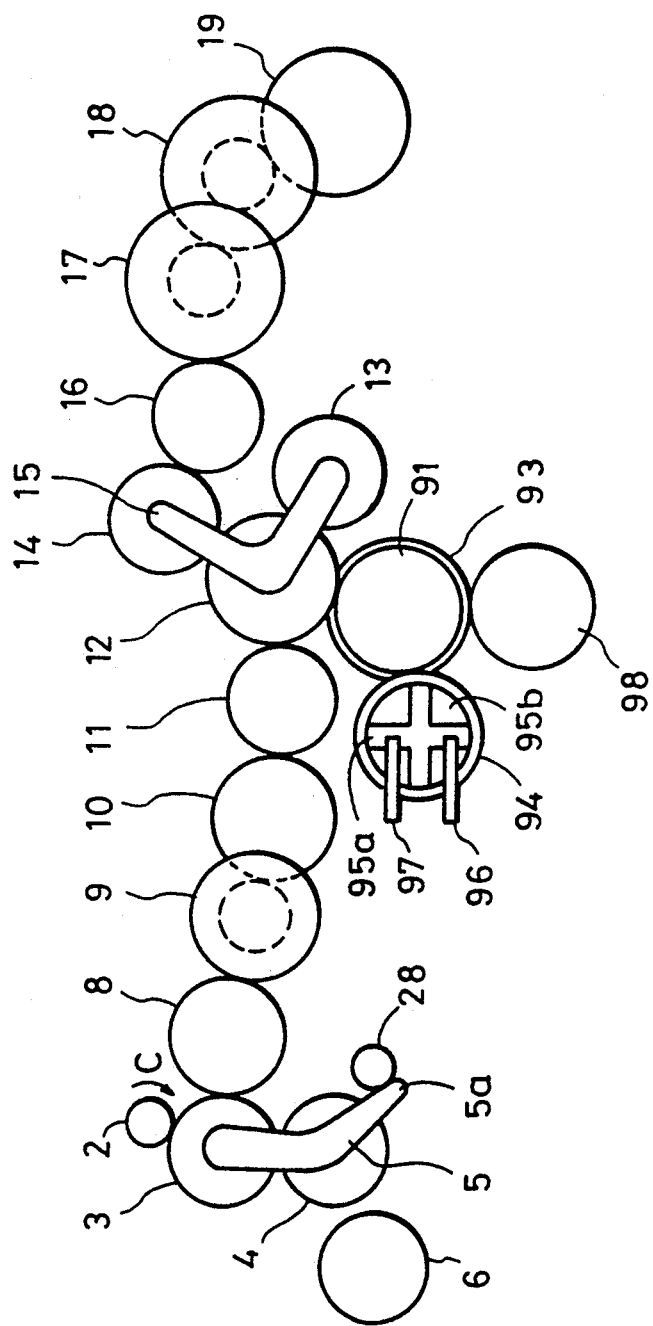
FIG. 33 is a plan view of the gear train at the time of film rewinding of the camera shown in FIG. 29.
Figure 34:
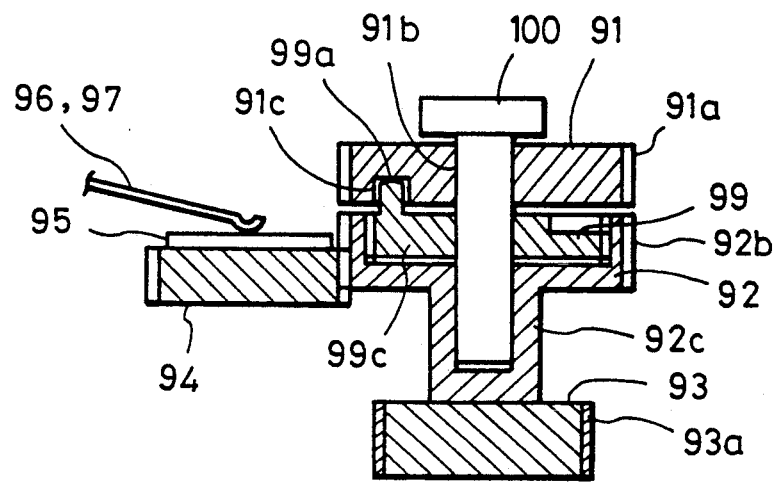
FIG. 34 is a longitudinal sectional view of a one-way clutch of the camera shown in FIG. 29.
Figure 35:
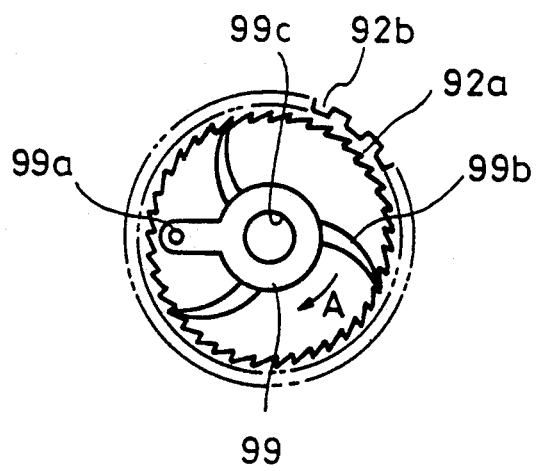
FIG. 35 is a transverse sectional view of the one-way clutch shown in FIG. 34.

FIGS. 29 to 35 show the sixth embodiment of the present invention; FIG. 30 is a transverse sectional view of an essential portion of the camera; FIG. 31 is a perspective view of a film feed mechanism; FIG. 32 is a plan view of a gear train at the time of film winding; FIG. 33 is a plan view of the gear train at the time of film rewinding; FIG. 34 is a longitudinal sectional view of a one-way clutch; and FIG. 35 is a transverse sectional view of this clutch.

Components of this embodiment corresponding to those of the above-described embodiments are indicated by the same reference characters and the description for them will not be repeated.

Members 91, 92, and 93 shown in these figures constitute a one-way clutch. Member 91 is a gear which meshes with second sun gear 12, and member 92 is a ratchet gear having ratchet teeth 92a formed over the inner circumference and gear teeth 92b formed on the outer circumference as shown in FIG. 35. A ratchet pawl member 99 has pawl portions 99b engaged with ratchet teeth 92a of ratchet gear 92. When a speed of ratchet pawl member 99 is created in the direction of arrow A shown in FIG. 35 relative to the ratchet gear 92, a driving force is transmitted from ratchet pawl member 99 to the ratchet gear 92. If the direction of this relative speed is opposite to the direction of arrow A, pawl portions 99b are bent to slip over ratchet teeth 92a, so that ratchet pawl member 99 does not transmit the driving force to ratchet gear 92. Ratchet pawl member 99 has a pin 99a which is fitted in a hole 91c of gear 91, as shown in FIG. 34. Ratchet pawl member 99 is therefore rotatable integrally with gear 91. Gear 91, ratchet pawl member 99 and ratchet gear 92 are supported on an unillustrated base plate 100 so as to be rotatable on a shaft passing through their respective holes 91b, 99c, and 92c. Member 93 is a roller member fixed to ratchet gear 92 and having an outer circumferential non-slip portion 93a formed of a rubber or knurled surface.

A pulse gear 94 meshes with gear teeth 92b of ratchet gear 92. A pulse plate 95 has conductive portions 95a and non-conductive portions 95b and is fixed on pulse gear 94. Contact pieces 96 and 97 serve to generate a number of pulses proportional to the amount of rotation of roller member 93 in cooperation with conductive portions 95a and non-conductive portions 95b of pulse plate 95.

An opposed roller 98 is rotatably attached to pressure plate 25.

Roller member 93 and opposed roller 98 are disposed as shown in FIG. 30 and are mounted in such a manner as to be pressed against each other at a predetermined pressure when roller member 93 is operated to pinch film 27 while rotating by following the movement of film 27 without slipping, or is mounted with a gap formed between them such that when film 27 passes between roller member 93 and opposed roller 98, a predetermined pressure is applied to roller member 93 and opposed roller 98. As can also be understood from the above, roller member 93 constitutes one film feed system and rotates with the movement of film 27. By being interlocked with this rotation through gear 92, pulse plate 95 also rotates to generate a pulse signal through contact pieces 96 and 97.

In the above-described arrangement, when film driving motor 1 (pinion gear 2) is rotated in the direction of arrow B (in the normal direction) as shown in FIG. 32 after film cartridge 33 has been set in cartridge chamber 35, first sun gear 3 rotates clockwise and, with this rotation, first planetary gear 4 revolves clockwise on first sun gear 3 by the operation of first connection lever 5 and then starts meshing with spool gear 6. A driving force of film driving motor 1 is thereby transmitted to spool gear 6 so that film take-up spool 7 is rotated clockwise.

Another driving force is transmitted from the motor to second sun gear 12 through idler gear 8 which is another gear meshing with first sun gear 3, and through first dual gear 9, second idler gear 10 and third idler gear 11. Second sun gear 12 is thereby rotated counterclockwise, second planetary gear 13 and the third planetary gear 14 are rotated counterclockwise on the second sun gear by the operation of second connection lever 15, and second planetary gear 13 then starts meshing with fourth idler gear 16. The driving force of film driving motor 1 in the direction B is thereby transmitted to fourth idler gear 16 as a counterclockwise driving force, and is further transmitted to fork gear 19 through second dual gear 17 and third dual gear 18, so that fork 20 is rotated clockwise.

As second sun gear 12 rotates as described above, a driving force in the clockwise direction (the direction of arrow A) is applied to gear 91 meshing with second sun gear 12. The one-way clutch constituted by gear 91, ratchet gear 92 and ratchet pawl member 99 operates to rotate integrally until the film is wrapped around spool 7. (Details of this operation will be described later.) With this rotation, roller member 93 rotates clockwise. As ratchet gear 92 rotates, pulse gear 94 meshing with ratchet gear 92 rotates to generate a pulse signal in accordance with the amount of rotation of roller member 93 by means of pulse plate 95 and contact pieces 97 and 96. This signal is detected by an encoder circuit (described later) shown in FIG. 29. The rotational speed and the amount of rotation of roller member 93 (the film 27 feeding speed and the amount of feeding) are thereby calculated.

The gear ratio of the gear train is selected as described below.

If the peripheral speed of film take-up spool 7 is V1, the peripheral speed of roller member 93 is V2, and the speed at which film 27 is extruded from film cartridge 33 by fork 20 is V3, then a relationship V1>V2>V3 is established.

As film 27 is extruded from film cartridge 33 by the clockwise rotation of fork 20, the film end enters the gap between pressure plate 25 and camera body 21 since the feed system is arranged to pinch film 27 between roller member 93 and opposed roller 98.

At this time, in the arrangement of this embodiment, the film end can be smoothly transported from the right to the left as viewed in FIG. 30 by the frictional force between film 27 and roller member 93, since roller member 93 is rotating clockwise. When film 27 is thereafter moved forward by roller member 93 and opposed roller 98, the driving force (rotational speed) thereof is transmitted through film 27 in order of fork gear 19, third dual gear 18, second dual gear 17 and fourth idler gear 16, and the counterclockwise rotational speed of fourth idler gear 16 becomes higher than the clockwise rotational speed of second planetary gear 13 in accordance with the speed relationship V2>V3. At this time, however, fourth idler gear 16 repels second planetary gear 13 so that second planetary gear 13 and fourth idler gear 16 are released from the meshing state for an instant, whereby the difference between the speeds thereof is absorbed.

When film 27 is wrapped around film take-up spool 7 by a well-known means (e.g., a means for hitching perforation holes of film 27 with claws provided on film take-up spool 7, or a means arranged on the camera body to press film 27 against film take-up spool 7), roller member 93 is rotated by the frictional force from film 27 in accordance with the relationship V1>V2>V3, so that roller member 93 rotates at a speed higher than that of gear 91. However, the torque of roller member 93 is not transmitted to gear 91 by the effect of the one-way clutch described above. At this time, as well, the amount of feeding and the speed of film 27 can be obtained by the later-described encoder circuit based on the pulse signal generated by pulse plate 95 and contact pieces 96 and 97. Further, because of the relationship V1>V2, the feed speed is greatly changed when film 27 is wrapped round film take-up spool 7. Therefore, it is possible to discriminate whether or not the automatic loading has been completed by observing this speed change.

As described above, when the film end is wrapped around take-up spool 7 of the camera, the film feeding speed, which is unstable during film feeding based on the extrusion operation of the feed spool 33b in film cartridge 33 or film feeding based on the rotation of roller member 93, is stabilized. That is, in the case of film feeding based on the extrusion operation of the feed spool 33b or on the rotation of roller member 93, the rotational speed of feed spool 33b in film cartridge 33 is abruptly changed when the film end is brought into contact with roller member 93 or is wrapped around film take-up spool 7 of the camera, and there is a strong possibility of a read error when film information written on bar code disk 33a is read out with photoreflector 49.

In this embodiment, therefore, the information written on bar code disk 33a is read out with photoreflector 49 after film 27 has been wrapped around film take-up spool 7. If reading is performed by this timing, a stable read signal can be obtained and the possibility of occurrence of read errors is very small.

Next, the operation of rewinding the film will be described below.

Referring to FIG. 33, as film driving motor 1 rotates in the direction of arrow C, first connection lever 5 and first planetary gear 4 revolve counterclockwise on first sun gear 3 until end 5a of first connection lever 5 is brought into abutment against stopper 28. First planetary gear 4 and spool gear 6 are thereby released from the state of meshing with each other.

Also, second sun gear 12 rotates clockwise, and second planetary gear 13 and third planetary gear 14 revolve on second sun gear 12 by the operation of second connection lever 15, so that fourth idler gear 16 and second planetary gear 13 are released from the state of meshing each other while fourth idler gear 16 and third planetary gear 14 start meshing with each other. Fork gear 19 therefore rotates counterclockwise, and feed spool 33b in film cartridge 33 is rotated in the reverse direction by the fork 20, so that film 27 is rewound into cartridge 33.

At this time, roller member 93 is rotated counterclockwise by film 27. However, the speed at which second sun gear 12 rotates gear 91 counterclockwise is higher, and gear 91 therefore has a speed in the opposite direction (opposite to the direction of arrow A) relative to ratchet gear 92. Accordingly, substantially no driving force is transmitted from ratchet gear 92 to gear 1 by the effect of the one-way clutch mechanism.

As film 27 is wound into film cartridge 33 in this manner, the film end passes roller member 93 and roller member 93 stops rotating, so that no pulse signal is generated by pulse plate 95 and contact pieces 96 and 97. Film rewinding operation is thereafter continued for a certain period of time, and is terminated by stopping the motor. (Details of this process will be described later.)

The results of detection of the amount of feeding and the speed of film 27 can also be utilized for controlling one-frame feeding of film 27.

FIG. 29 shows electrical blocks of the camera of this embodiment.

The camera has a control circuit 102 for overall camera operation control, and an encoder circuit 101 for detecting the pulse signal generated by pulse plate 95 and contact pieces 96 and 97 to calculate the rotational speed of roller member 93 (film 27 feeding speed) and the amount of rotation (the amount of film 27 feeding) and other quantities.

Figure 36:
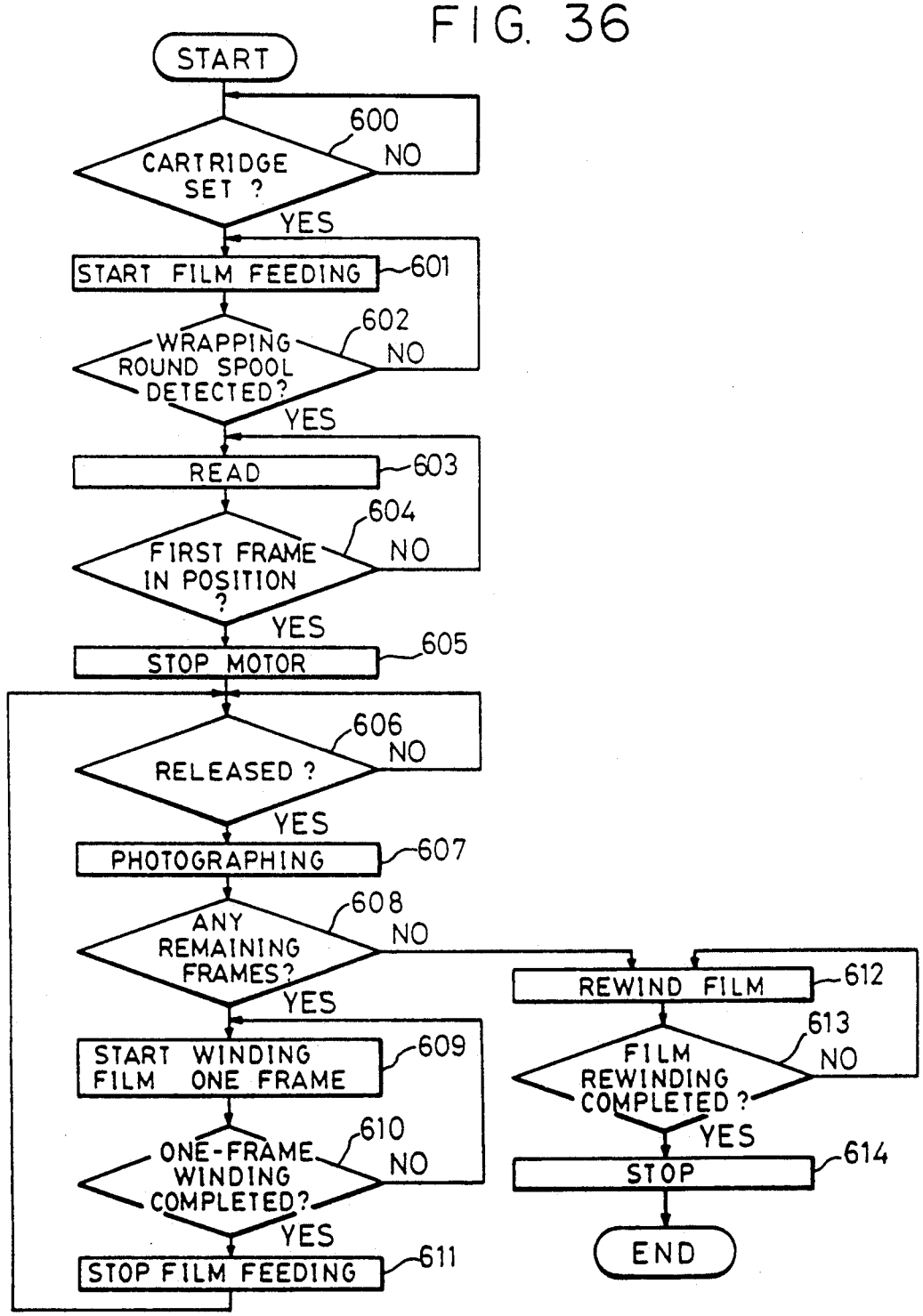
FIG. 36 is a flow chart of the operation of the control circuit shown in FIG. 29.

The operation of control circuit 102 will be described below with reference to the flow chart of FIG. 36.

[Step 600] Film cartridge 33 is set in cartridge chamber 22, and cartridge cover 51 is closed. Both cartridge cover opening/closing switch 53 and cartridge detection switch 68 are thereby turned on, and control circuit 102 determines that film cartridge 33 has been set in the camera from these switch operations. The process then proceeds to step 601.

[Step 501] Since film cartridge 33 has been set, a winding start signal is sent to film feed control circuit 66 in this step. Film driving motor 1 is thereby rotated in the direction of arrow B as shown in FIG. 32 to start extruding film 27 from film cartridge 33 by the above-described gear train. Simultaneously, the pulse signal corresponding to the rotation of roller member 93 is supplied from the encoder circuit 101. From this signal and an internal clock signal, the rotational speed v and the acceleration (dv/dt) of roller member 93 is calculated.

If the number of pulses of the pulse signal counted in a predetermined period of time is N, $$v \propto N, (dv/dt) \propto (dN/dt)$$

or, if the time interval at which pulses are generated is T, $$v \propto 1/T, (dv/dt) \propto d(1/T)/dt$$

[Step 602] Determination is made as to whether or not the rotational speed of roller member 93 obtained in step 601 is abruptly changed. If it is abruptly changed, it is determined that film 27 has been wrapped around film take-up spool 7, and the process proceeds to step 603.

The reason for determining that film 27 is wrapped around film take-up spool 7 when the rotational speed of roller member 93 is abruptly changed will be described below.

Figure 37:
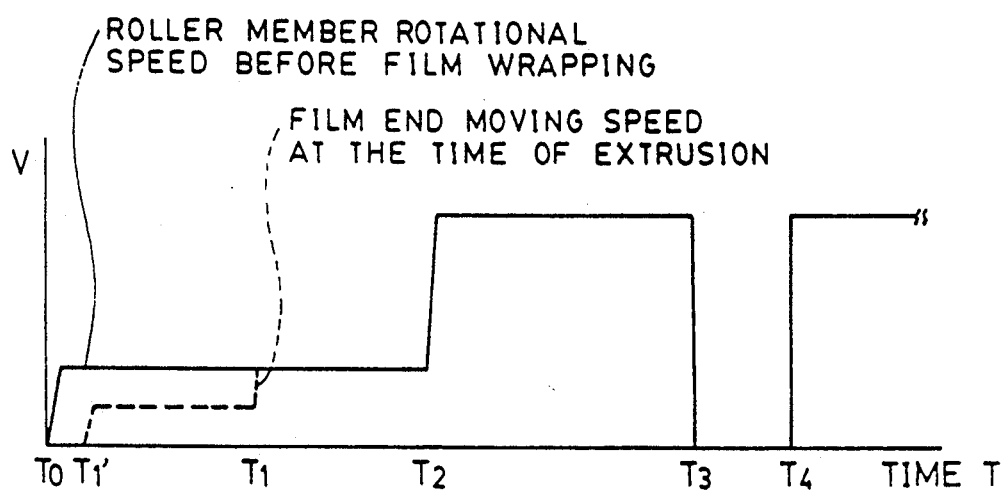
FIG. 37 is a timing chart of the operation shown in FIG. 36.

FIG. 37 shows the relationship between the film 27 feed speed and the rotational speed of roller member 93

As shown in FIG. 37, film winding (extrusion) is started at a time T0 after the time when the camera is loaded with film cartridge 27. The thin solid line indicates the rotational speed of roller member 93, while the broken line indicates the speed at which the film end moves when the film is extruded by fork driving. Actually, the speeds fluctuate slightly due to load changes, but such fluctuations are negligibly small in comparison with major changes and are, therefore, not illustrated.

The period of time from T0 to T1 is a film extrusion period. The start of the film end movement is delayed (by T1') because an unwound portion of film 27 slacks in film cartridge 33. Film 27 is actually extruded by fork 20 for the period of time from T1' to T1. The film feed speed during this period is determined by the rotational speed of fork 20. During this period, roller member 93 is rotated at a speed determined by the rotation of film driving motor 1 and the gear ratio of the gear train through which the driving force is transmitted to the roller member 93.

At time T1, the film end reaches roller member 93. Thereafter, film 27 is drawn out in accordance with rotational speed of roller member 93 until it reaches film take-up spool 7. During this operation, the film extrusion driving with fork 20 is ineffective, as mentioned above.

For the period of time from T1 to T2, the film end is transported to film take-up spool 7. At time T2, film 27 is wrapped around film take-up spool 7. That is, the abrupt change in the roller member 93 speed indicates that film 27 is wrapped round film take-up spool 7 so that roller member 93 is rotated in accordance with the rotation of spool 7. Thereafter, film winding is continued until the film is set to the predetermined position (at which the first frame reaches the position corresponding to the aperture) in accordance with the rotational speed of film take-up spool 7. During this period, the driving force of roller member 93 is ineffective.

When the first frame is moved to the predetermined position, film winding conducted by film feed control circuit 66 is stopped, and film take-up spool 7 is also stopped at time T3. After the completion of photographing on the first frame, that is, from time T4 at which the photographing operation described later is completed, film winding is started again until the second frame is set.

If no abrupt change in the rotational speed of roller member 93 is detected in step 602, the process returns to step 601 to continue film feeding until film 27 is wrapped around film take-up spool 7.

[Step 603] Photoreflector control circuit 67 is operated to read, with photoreflector 49, information on the film written on bar code disk 33a, e.g., the film speed and the specified number of film frames.

[Step 604] Determination is made as to whether or not the first frame has reached the position corresponding to the aperture from the count content of encoder circuit 101. Film feeding is continued until the first frame reaches this position. If it is determined that the first frame has reached the position at the aperture, the process proceeds to step 605.

[Step 605] Driving of film driving motor 1 is stopped through film feed control circuit 66 to stop winding the film.

When the above operations are finished, the process proceeds to step 606.

[Step 606] Determination is made as to whether or not the unillustrated release button has been depressed so that switch 69 is turned on. If it is determined that switch 69 has been turned on, the process proceeds to step 607.

[Step 607] AF/AE control circuit 64 is operated to measure the luminance of the subject and to calculate information on the distance to the subject (distance metering information), and photographing operations including the operation of focusing the unillustrated lens and the exposure operation based on shutter control are performed based on the information obtained by AF/AE control circuit 64.

[Step 608] The number of release operations, the amount of film feeding or the like are compared with the specified number of film frames read out in step 603 to determine whether there are any remaining frames. If there is no remaining frame, the process proceeds to step 612. If there are some remaining frames, the process proceeds to step 609.

[Step 609] Film feed control circuit 66 is operated to start winding to set the next frame.

[Step 610] Determination is made as to whether or not film 27 has been wound one frame by, for example, counting perforation holes in film 27 with an unillustrated photointerrupter or detecting the amount of feeding of film 27 by the above-mentioned encoder circuit 101. If it is determined that film 27 has been wound one frame, the process proceeds to step 611.

[Step 611] Driving of film driving motor 1 is stopped through film feed control circuit 66 to stop winding film 27, and the process returns to step 606.

[Step 612] Film driving motor 1 is driven in the direction of arrow C of FIG. 31 through film feed control circuit 66 to start rewinding film 27 (winding into film cartridge 33).

[Step 613] Determination is made as to whether or not the rotational speed v of roller member 93 is equal to "0", that is, the rotation of roller member 93 has been stopped by calculating the rotational speed of roller member 93 by encoder circuit 101. If YES, an elapse of a predetermined time is awaited and the process then proceeds to step 614.

[Step 614] Driving of film driving motor 1 is stopped through film feed control circuit 66, and the overall camera operation is thereafter stopped.

Figure 38:
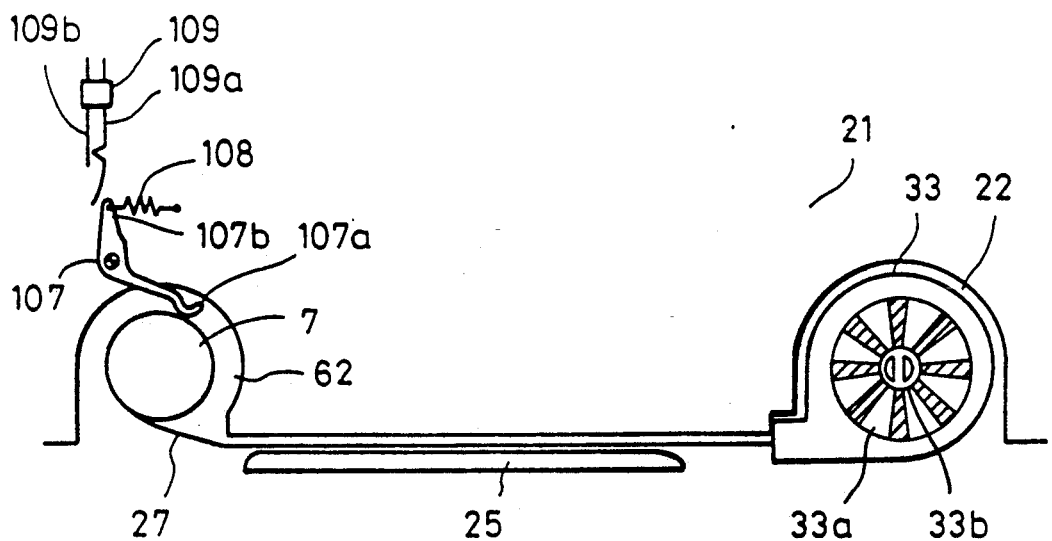
FIG. 38 is a plan view of an essential portion of a camera in accordance with a seventh embodiment of the present invention.

FIG. 38 is a transverse sectional view of an essential portion of a camera in accordance with the seventh embodiment of the present invention. Components of this embodiment corresponding to those of the above-described embodiments are indicated by the same reference characters.

The camera in accordance with this embodiment is supposed to be a pre-wind type such that film 27 is previously wound up around film take-up spool 7 and is used for photographing by being rewound into film cartridge 33 by one frame at a time.

A member 107 shown in FIG. 38 is a body roller lever which is rotatably attached to camera body 21 and which has a portion 107a for pressing film 27 against film take-up spool 7 so that automatic film loading can be effected correctly. A spring 108 is attached at its one end to camera body 21 and at the other end to body roller lever 107 to apply an urging force to body roller lever 107 so that body roller lever 107 rotates clockwise. A take-up detection switch 109 has contact pieces 109a and 109b. Contact piece 109a is engagable with a portion 107b of body roller lever 107 and is deformed by counterclockwise rotation of body roller lever 107 to be brought into contact with contact piece 109b.

In the above-described arrangement, as film 27 is wound around film take-up spool 7 after being wrapped and received thereon, body roller lever 107 rotates counterclockwise against the urging force of spring 108, and turns on switch 109 by its portion 107b, that is, electrical connection is established between contact pieces 109a and 109b. By being interlocked with this connection, photoreflector control circuit 67 described in the above-described embodiments is operated to read information from bar code disk 33a with photoreflector 49. Thereafter, film 27 is used for photographing by being moved one frame at a time to be accommodated in film cartridge 33.

FIG. 39 is a longitudinal sectional view of a film cartridge and a portion of a camera in the vicinity of this cartridge in accordance with the eighth embodiment of the present invention. Components of this embodiment corresponding to those of the above-described embodiments are indicated by the same reference characters.

In the above-described embodiments, information on film 27 written on bar code disk 33a provided on film cartridge 33 is expressed in a bar code form. In this embodiment, corresponding information is recorded on a disk 33d by a magnetic means, and a magnetic head 82 is disposed as a means for reading the magnetic information recorded on disk 33d moving relative to the magnetic head 82. Magnetic head 82 is mounted on a flexible printed circuit board 83 which is connected to magnetic head driving circuit 65 and control circuit 63.

In the above-described embodiments, the present invention is applied to a camera using an extrusion type film cartridge. However, needless to say, the present invention can also be applied to a type of camera in which an ordinary film cartridge is used and in which film feeding is performed by using sprockets capable of meshing with perforation holes of the film. Also, the member which is rotated integrally with the feed spool in the film cartridge and on which information on the film is written is not limited to a member on which the information is written as a bar code, and any other member, e.g., a magnetic recording disk, such as that shown in FIG. 39, from which information is read out as it moves relative to a magnetic head, is available in accordance with the present invention.

Although the above-described embodiments are arranged so that the pressure plate and the magnetic head is integrally movable, the present invention is also effective with respect to an arrangement in which the magnetic head is movable perpendicularly to the film traveling direction while the pressure plate is fixedly mounted on the camera body, and in which a guide member movable integrally with the magnetic head is provided.

Further, although in the above-described embodiments reading information from the bar code disk is started after film feeding has been stabilized, the reading start in accordance with the present invention includes a substantial reading start, and this start timing can be used in the case of one-frame feeding or continuous feeding as well as frame blank feeding.

While the present invention has been described with respect to what presently are considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A camera using a film cartridge containing a film with a leader portion and having an information recording member movable with the rotation of a film feed spool, said camera comprising:
   (a) information reading means for reading information from the information recording member during rotation thereof;
   (b) film feed means for feeding the film;
   (c) a film take-up spool for receiving the film fed by said film feeding means; and
   (d) control means for controlling said information reading means to begin reading the information substantially at a predetermined time after the film reading is initiated,
   wherein the predetermined time is a time at which the film leader portion becomes wrapped around said film take-up spool.

2. A camera according to claim 1, wherein said information reading means comprises means for reading bar-code information from the information recording member.

3. A camera according to claim 1, wherein said film feed means comprises means for extruding the film from the film cartridge.

4. A camera using a film cartridge containing a film with a leader portion and having an information recording member movable with the rotation of a film feed spool, said camera comprising:
   (a) information reading means for reading information from the information recording member during rotation thereof;
   (b) film feed means for feeding the film;
   (c) magnetic action means for performing at least one of a writing operation and a reading operation at a magnetic recording portion of the film;
   (d) control means for controlling said information reading means to begin reading the information substantially at a predetermined time after the film feeding is initiated,
   wherein the predetermined time is a time at which the film leader portion passes said magnetic action means.

5. A camera according to claim 4, wherein said information reading means comprises means for reading bar-code information from the information recording member.

6. A camera according to claim 4, wherein said film feed means comprises means for extruding the film from the film cartridge.

7. A camera using a film cartridge containing a film with a leader portion and having an information recording member movable with the rotation of a film feed spool, said camera comprising:
   (a) information reading means for reading information from the information recording member during rotation thereof;
   (b) film feed means for feeding the film;
   (c) film position restriction means for restricting the position of the film; and
   (d) control means for controlling said information reading means to begin reading the information substantially at a predetermined time after the film feeding is initiated,
   wherein the predetermined time is a time at which the film leader portion passes said film position restriction means.

8. A camera according to claim 7, wherein said information reading means comprises means for reading bar-code information from the information recording member.

9. A camera according to claim 7, wherein said film feed means comprises means for extruding the film from the film cartridge.

10. A camera using a film cartridge containing a film with a leader portion and having an information recording member rotatable with the rotation of a film feed spool, said camera comprising:
    information reading means for reading information from the information recording member during rotation thereof;
    film feed means for feeding the film;
    film position detection means for detecting a position of the film leader portion; and
    control means for controlling said information reading means to begin reading the information substantially at a time when said film position detection means detects the film leader portion at a predetermined position.

11. A camera according to claim 10, further comprising a pressure plate defining a path along which the film is fed, and wherein said film position detection means comprises means for detecting when the film leader portion passes a portion of said pressure plate.

12. A camera according to claim 10, further comprising:
    magnetic action means for performing at least one of a writing operation and a reading operation at a magnetic recording portion of the film;
    wherein said film position detection means comprises means for detecting when the film leader portion passes said magnetic action means.

13. A camera according to claim 12, wherein said magnetic action means comprises a magnetic head.

14. A camera according to claim 10, further comprising:
    film position restriction means for restriction the position of the film,
    wherein said film position detection means comprises means for detecting when the film leader portion passes said film position restriction means.

15. A camera according to claim 10, wherein said film position detection means comprises an optical detector.

16. A camera according to claim 10, wherein said film position detection means comprises a mechanical detector.

17. A camera according to claim 10, further comprising a film take-up spool for receiving the film fed by said film feed means,
wherein said control means comprises state detection means for detecting when the film leader portion becomes wrapped around said film take-up spool.

18. A camera according to claim 17, wherein said state detection means comprises means for detecting a change in a traveling speed of the film.

19. A camera according to claim 17, wherein said state detection means comprises a mechanical detector.

20. An information reading apparatus for a camera using a film cartridge containing a film with a leader portion and having an information recording member movable with the rotation of a film feed spool, wherein the camera has film feed means for feeding the film and a film take-up spool for receiving the film fed by the film feed means, said apparatus comprising:
    (a) information reading means for reading information from the information recording member during movement thereof; and
    (b) control means for controlling said information reading means to begin reading the information substantially at a predetermined time after the film feeding is initiated,
    wherein the predetermined time is a time at which the film leader portion becomes wrapped around the film take-up spool.

21. An information reading apparatus according to claim 20, wherein said information reading means comprises means for reading bar-code information from the information recording member.

22. An information reading apparatus according to claim 20, wherein the film feed means comprises means for extruding the film from the film cartridge.

23. An information reading apparatus for a camera using a film cartridge containing a film with a leader portion and having an information recording member movable with the rotation of a film feed spool, wherein the camera has film feed means for feeding the film and magnetic action means for performing at least one of a writing operation and a reading operation at a magnetic recording portion of the film, said apparatus comprising:
    (a) information reading means for reading information from the information recording member during movement thereof; and
    (b) control means for controlling said information reading means to begin reading the information substantially at a predetermined time after the film feeding is initiated,
    wherein the predetermined time is a time at which the film leader portion passes the magnetic action means.

24. An information reading apparatus according to claim 23, wherein said information reading means comprises means for reading bar-code information from the information recording member.

25. An information reading apparatus according to claim 23, wherein the film feed means comprises means for extruding the film from the film cartridge.

26. An information reading apparatus for a camera using a film cartridge containing a film with a leader portion and having an information recording member movable with the rotation of a film feed spool, wherein the camera has film feed means for feeding the film and film position restriction means for restricting the position of the film, said apparatus comprising:
    (a) information reading means in the camera for reading information from the information recording member during movement thereof; and
    (b) control means for controlling said information reading means to begin reading the information substantially at a predetermined time after the film feeding is initiated,
    wherein the predetermined time is a time at which the film leader portion passes the film position restriction means.

27. An information reading apparatus according to claim 26, wherein said information reading means comprises means for reading bar-code information from the information recording member.

28. An information reading apparatus according to claim 26, wherein the film feed means comprises means for extruding the film from the film cartridge.

29. An information reading apparatus for a camera using a film cartridge containing a film with a leader portion and having an information recording member movable with the rotation of a film feed spool, wherein the camera has film fed means for feeding the film and film position detection means for detecting a position of the film leader portion and outputting a signal indicative of the position, said apparatus comprising:
    (a) information reading means for reading information from the information recording member during rotation thereof; and
    (b) control means for receiving the signal from the film position detection means and controlling said information reading means to begin reading the information substantially at a time when the film position detection means detects the film leader portion at a predetermined position.

30. An information reading apparatus according to claim 29, wherein the camera includes a pressure plate defining a path along which the film is fed, and the film position detection means comprises means for detecting when the film leader portion passes a portion of the pressure plate, wherein said control means controls said information leading means to begin reading the information substantially when the film position detection means detects the film leader portion passing the pressure plate.

31. An information reading apparatus according to claim 29, wherein the camera includes magnetic action means for performing at least one of a writing operation and a reading operation at a magnetic recording portion of the film, and the film position detection means comprises means for sensing that the film leader portion passes said magnetic action means, wherein said control means controls said information reading means to begin reading the information substantially when the film position detection means senses the film leader portion passing the magnetic action means.

32. An information reading apparatus according to claim 31, wherein the magnetic action means comprises a magnetic head.

33. An information reading apparatus according to claim 29, wherein the camera includes film position restriction means for restricting the position of the film, and the film position detection means comprises means for detecting when the film leader portion passes said film position restriction means, wherein said control means controls said information reading means to begin reading the information substantially when the film position detection means detects the film leader portion passing the film position restriction means.

34. An information reading apparatus according to claim 29, wherein the position detection means comprises an optical detector.

35. An information reading apparatus according to claim 29, wherein the film position detection means comprises a mechanical detector.

36. An information reading apparatus according to claim 29, wherein the camera includes a film take-up spool for receiving the film fed by the film feed means, and wherein said control means comprises state detection means for detecting when the film leader portion becomes wrapped around the film take-up spool.

37. An information reading apparatus according to claim 36, wherein said state detection means comprises means for detecting a change in a traveling speed of the film.

38. An information reading apparatus according to claim 26, wherein said state detection means comprises a mechanical detector.

* * * * *

UNITED STATES PATENT AND TRADEMARK OFFICE
CERTIFICATE OF CORRECTION

PATENT NO. : 5,283,604  
DATED : February 1, 1994  
INVENTOR(S) : CHIKARA AOSHIMA Page 1 of 3

It is certified that error appears in the above-indentified patent and that said Letters Patent is hereby corrected as shown below:

IN THE DRAWINGS

SHEET 23, FIGURE 28

"89" (lower right) should read --62--.

COLUMN 2

Line 21, "line A" should read --line 7A-7A--.  
Line 22, "-A" should be deleted.  
Line 23, "line B" should read --line 7-7.  
Line 24, "-B" should be deleted.  
Line 56, "A-A" should read --23A-23A--.

COLUMN 3

Line 11, "FIG. 29; FIG. 34" should read --FIG. 29 ¶ FIG. 34--.  
Line 42, "line A-A" should read --line 7A-7A--.  
Line 44, "B-B" should read --7-7--.

UNITED STATES PATENT AND TRADEMARK OFFICE
CERTIFICATE OF CORRECTION

PATENT NO. : 5,283,604
DATED : February 1, 1994
INVENTOR(S) : CHIKARA AOSHIMA

It is certified that error appears in the above-indentified patent and that said Letters Patent is hereby corrected as shown below:

COLUMN 8

Line 41, "meshing" should read --meshing with--.

COLUMN 9

Line 37, "cord" should read --code--.

COLUMN 11

Line 6, "cartridge 3" should read --cartridge 33--.

COLUMN 16

Line 61, "line A-A" should read --line 23A-23A--.

COLUMN 19

Line 9, "direction)" should read --direction--.

COLUMN 20

Line 1, "FIGS. 28;" should read --FIG. 28.
Line 10, "pressure plate" should read --pressure plate 89--.
Line 15, "influences" should read --influence--.
Line 19, "spool chamber 89" should read --spool chamber 62--.

UNITED STATES PATENT AND TRADEMARK OFFICE
CERTIFICATE OF CORRECTION

PATENT NO. : 5,283,604
DATED : February 1, 1994
INVENTOR(S) : CHIKARA AOSHIMA

It is certified that error appears in the above-indentified patent and that said Letters Patent is hereby corrected as shown below:

COLUMN 23

Line 13, "meshing" should read --meshing with--.
    Line 25, "gear 1" should read --gear 91--.
    Line 56, "[Step 501]" should read --[Step 601]--.

COLUMN 27

Line 37, "reading" should read --feeding--.

COLUMN 30

Line 44, "leading" should read --reading--.

COLUMN 32

Line 9, "claim 26," should read --claim 36--.

Signed and Sealed this

Thirtieth Day of August, 1994

Attest:

BRUCE LEHMAN

Attesting Officer      Commissioner of Patents and Trademarks